L. G. JULIHN.
COMBINED TYPE WRITING AND ADDING MACHINE.
APPLICATION FILED JUNE 4, 1906.

1,275,937.

Patented Aug. 13, 1918.
18 SHEETS—SHEET 1.

Louis G. Julihn, Inventor

Witnesses
Jas. F. McCathran
B. G. Foster

By C. G. Siggers
Attorney

L. G. JULIHN.
COMBINED TYPE WRITING AND ADDING MACHINE.
APPLICATION FILED JUNE 4, 1906.

1,275,937.

Patented Aug. 13, 1918.
18 SHEETS—SHEET 3.

Louis G. Julihn, Inventor

Witnesses

Attorney

L. G. JULIHN.
COMBINED TYPE WRITING AND ADDING MACHINE.
APPLICATION FILED JUNE 4, 1906.

1,275,937.

Patented Aug. 13, 1918.
18 SHEETS—SHEET 4.

Witnesses
Jas. K. McCathran
B. G. Foster

Louis G. Julihn, Inventor
By C. G. Siggers
Attorney

L. G. JULIHN.
COMBINED TYPE WRITING AND ADDING MACHINE.
APPLICATION FILED JUNE 4, 1906.

1,275,937.

Patented Aug. 13, 1918.
18 SHEETS—SHEET 5.

Louis G. Julihn, Inventor

Witnesses

By

Attorney

L. G. JULIHN.
COMBINED TYPE WRITING AND ADDING MACHINE.
APPLICATION FILED JUNE 4, 1906.

1,275,937.

Patented Aug. 13, 1918.
18 SHEETS—SHEET 6.

Witnesses
Jas. F. McCathran
B. F. Foster

Louis G. Julihn, Inventor

By E. G. Siggers
Attorney

L. G. JULIHN.
COMBINED TYPE WRITING AND ADDING MACHINE.
APPLICATION FILED JUNE 4, 1906.
1,275,937.
Patented Aug. 13, 1918.
18 SHEETS—SHEET 12.
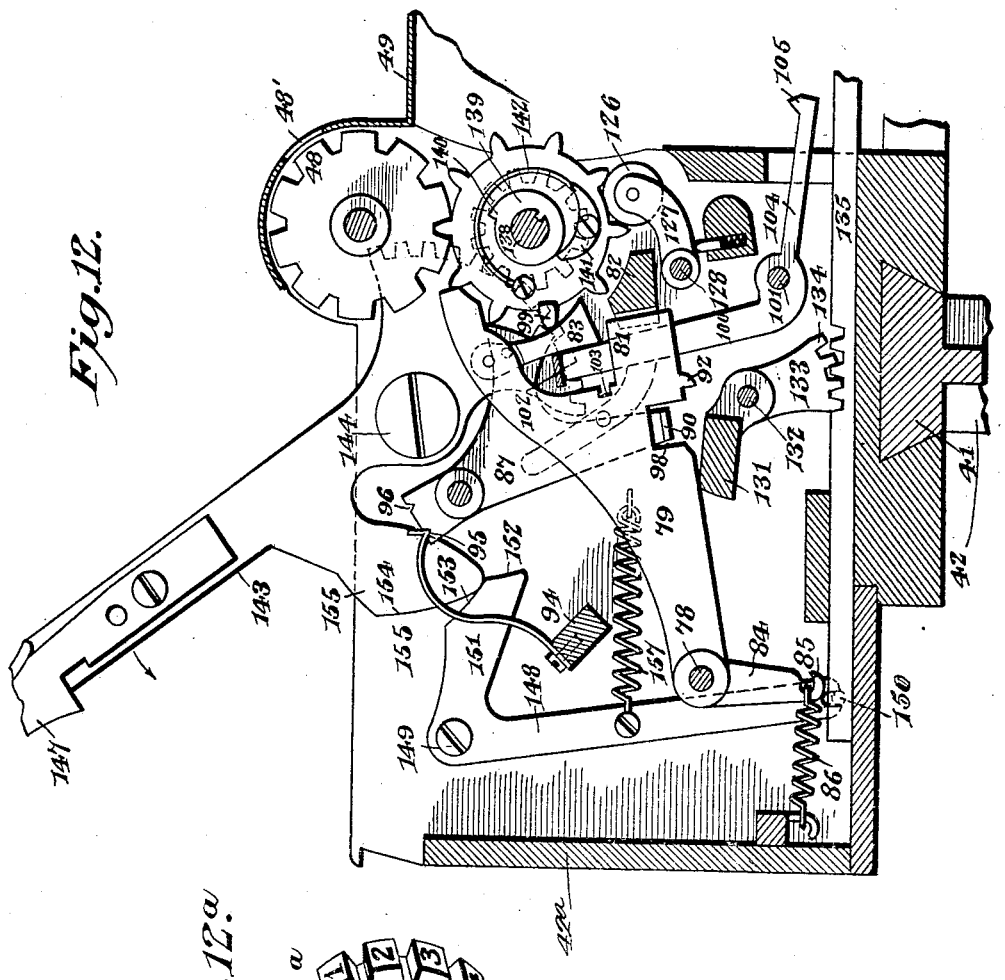
Fig.12.
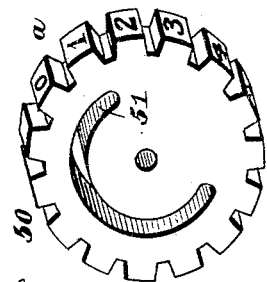
Fig.12ª.
Witnesses
Jas. W. McCathran
B.G. Foster
Louis G. Julihn,
Inventor
By C.G. Siggers
Attorney

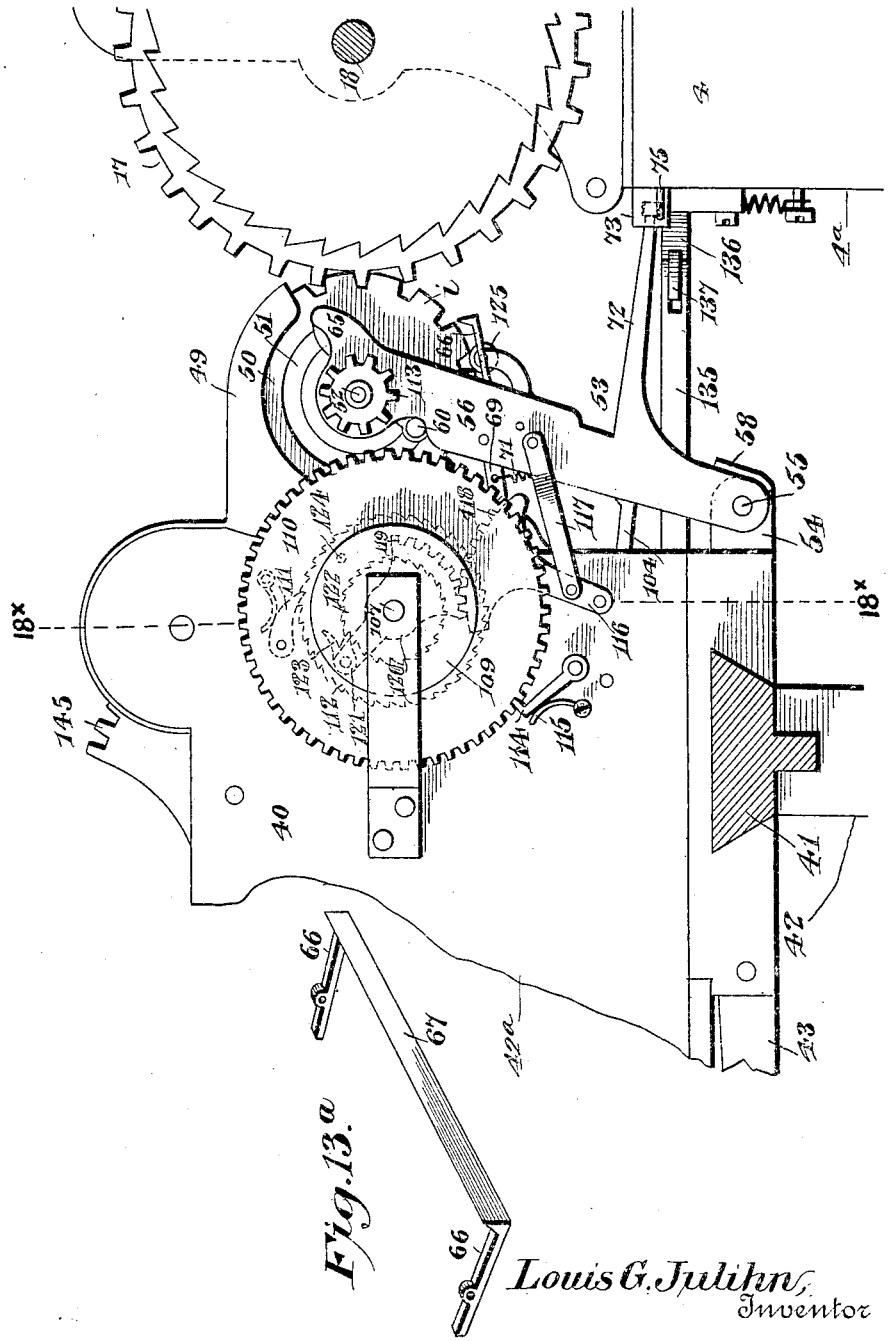

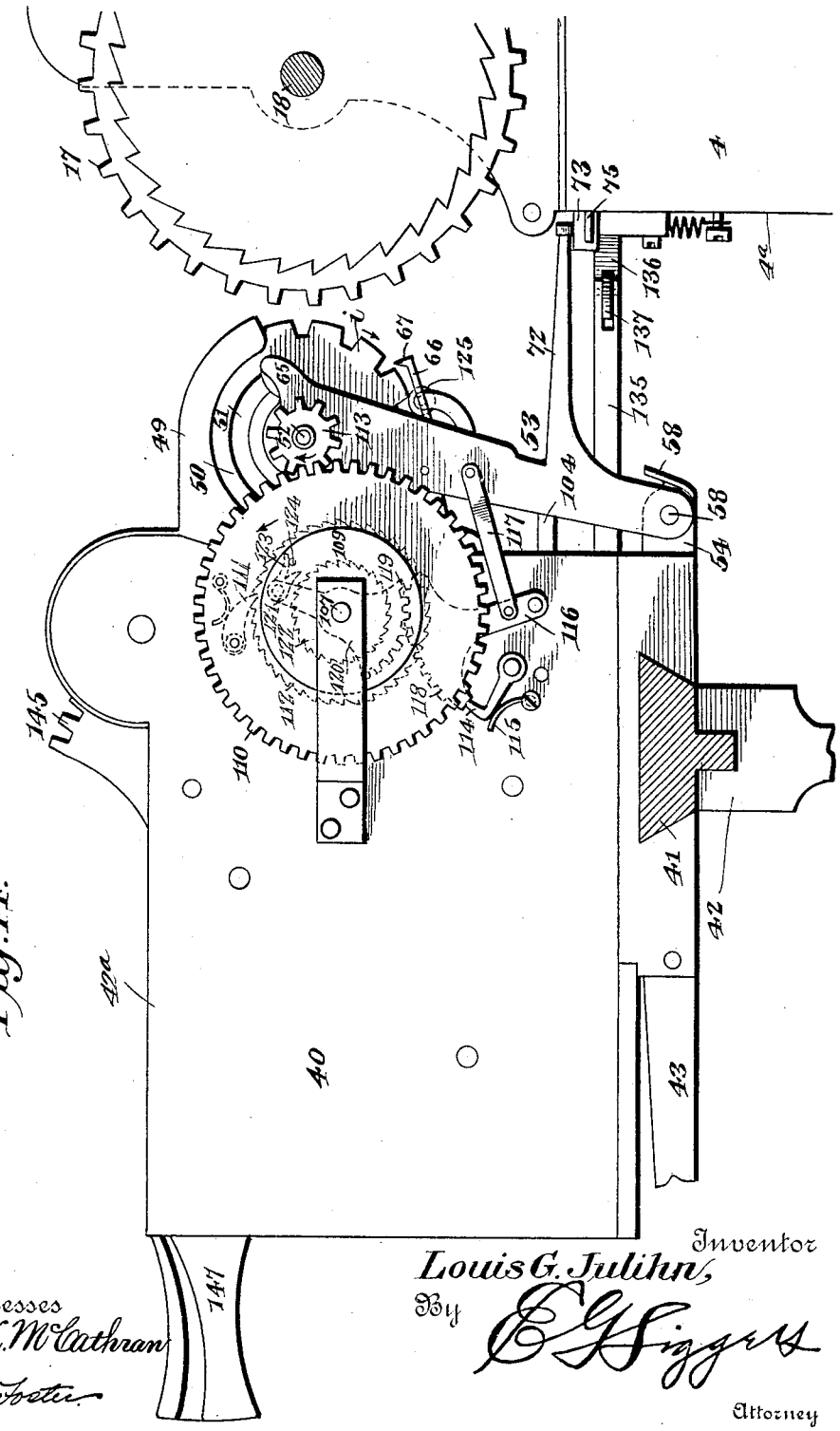

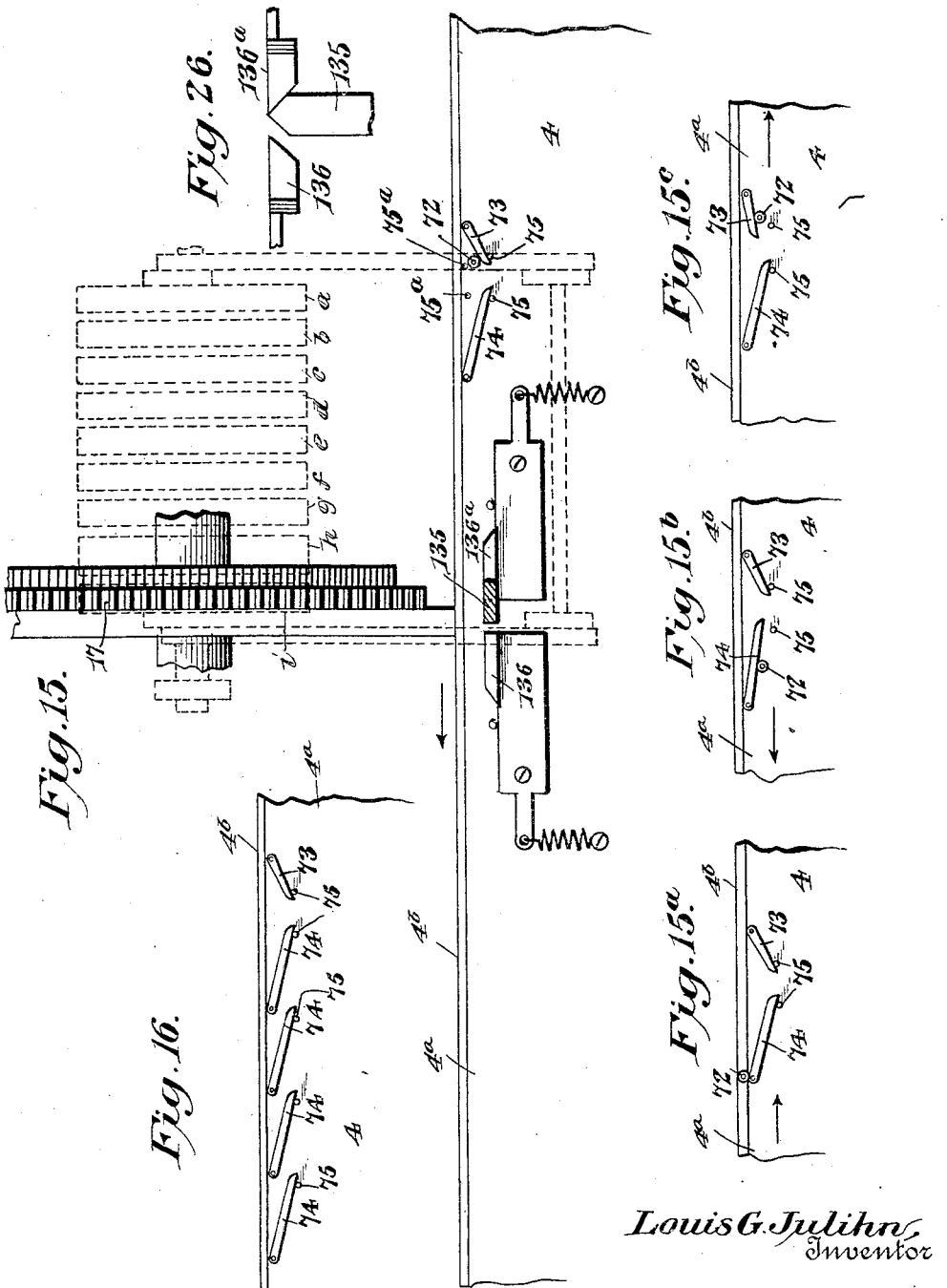

L. G. JULIHN.
COMBINED TYPE WRITING AND ADDING MACHINE.
APPLICATION FILED JUNE 4, 1906.
1,275,937.
Patented Aug. 13, 1918.
18 SHEETS—SHEET 16.
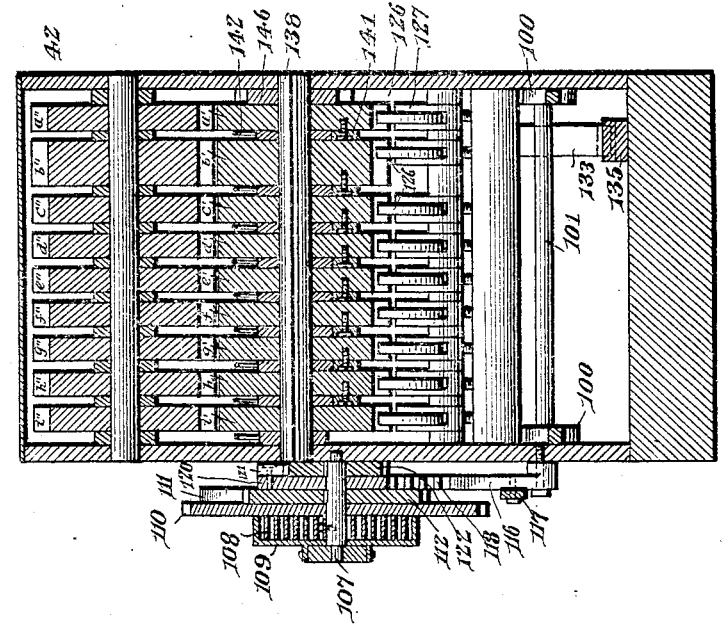
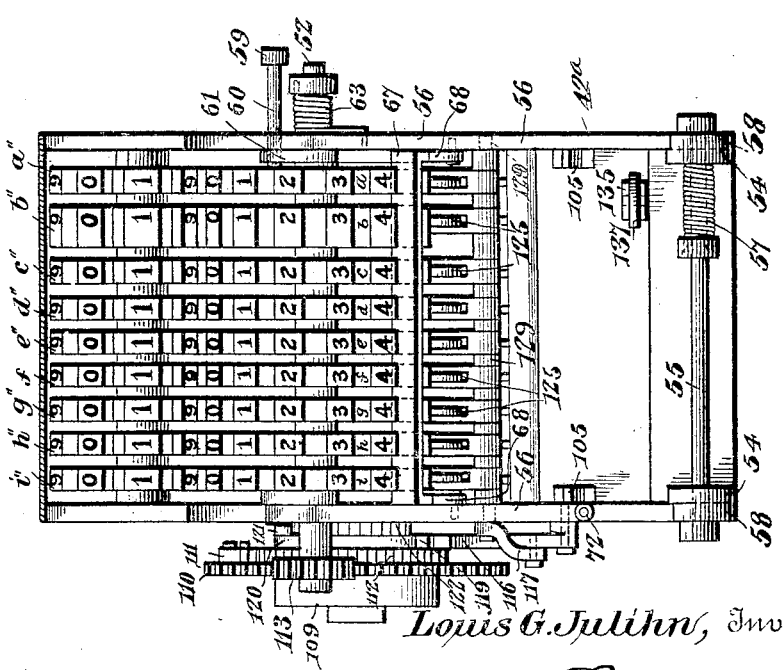
Witnesses
Jas. F. McCathran
B. G. Foster
Louis G. Julihn, Inventor
By C. G. Siggers
Attorney

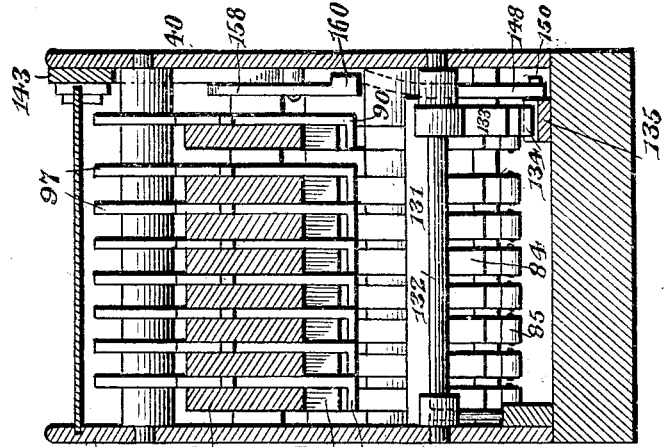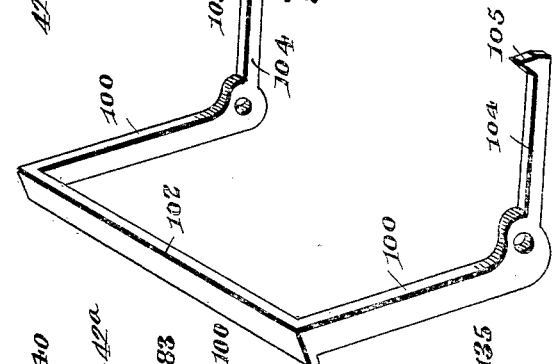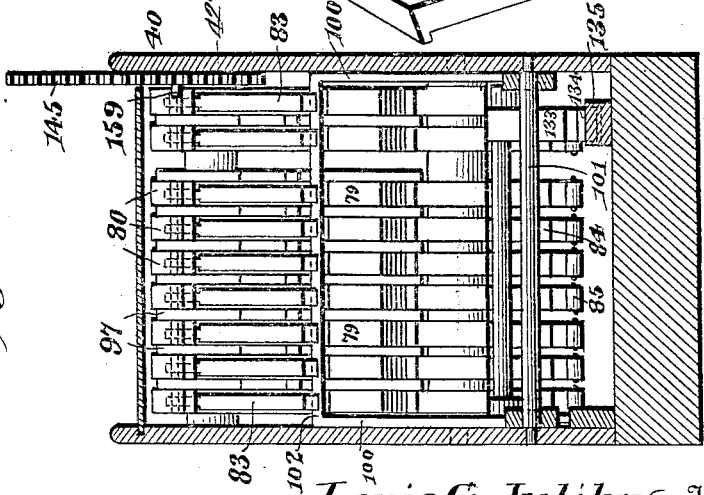

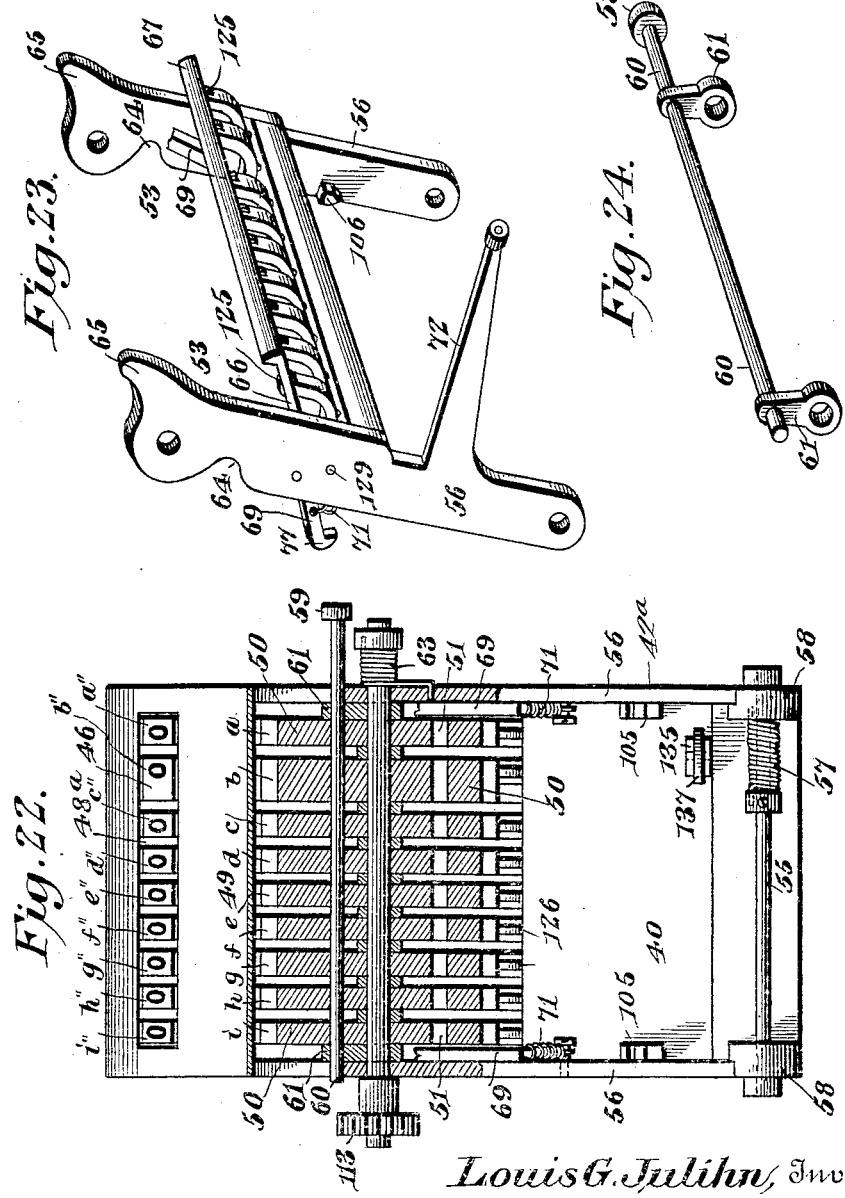
L. G. JULIHN.
COMBINED TYPE WRITING AND ADDING MACHINE.
APPLICATION FILED JUNE 4, 1906.
1,275,937.
Patented Aug. 13, 1918.
18 SHEETS—SHEET 18.

UNITED STATES PATENT OFFICE.

LOUIS G. JULIHN, OF WASHINGTON, DISTRICT OF COLUMBIA, ASSIGNOR TO ELLIOTT-FISHER COMPANY, OF NEW YORK, N. Y., A CORPORATION OF DELAWARE.

COMBINED TYPE-WRITING AND ADDING MACHINE.

1,275,937.      Specification of Letters Patent.      Patented Aug. 13, 1918.

Application filed June 4, 1906. Serial No. 320,153.

*To all whom it may concern:*

Be it known that I, LOUIS G. JULIHN, a citizen of the United States, residing at Washington, in the District of Columbia, have invented a new and useful Combined Type-Writing and Adding Machine, of which the following is a specification.

My present invention relates to calculating machines, but more particularly to a combined typewriting and adding machine, in which the total of the numbers recorded by the typewriting mechanism is mechanically computed and registered. To this type of machines, as ordinarily constructed, two primary objections are urged. First, it is impossible to detect the commission of an error due, for instance, to the striking of the wrong key, because the only amount registered and exhibited before the operator is the total of the numbers printed, and as the correct total is unknown, an inspection of the erroneous total fails to reveal the error. Second, if an error has been made, it is impossible to correct it because the erroneous item or number will have been set up on the register and cannot be eliminated.

The primary objects of my invention, therefore, are first, to provide mechanism for registering the individual items or numbers, as well as the total of the numbers previously printed, so that the individual number will be exhibited to the operator as it is written, in order to facilitate the detection of error, and second, to provide for the correction of error by equipping the machine with an item or number register upon which each individual number is set up by the keys and from which the number, if correct, will be automatically transferred to the total register, or from which the number, if incorrect, may be eliminated by the manipulation of an error key without affecting the total register.

Subordinate to these primary objects are many others which will more fully appear hereinafter.

In the accompanying drawings—

Figure 7:
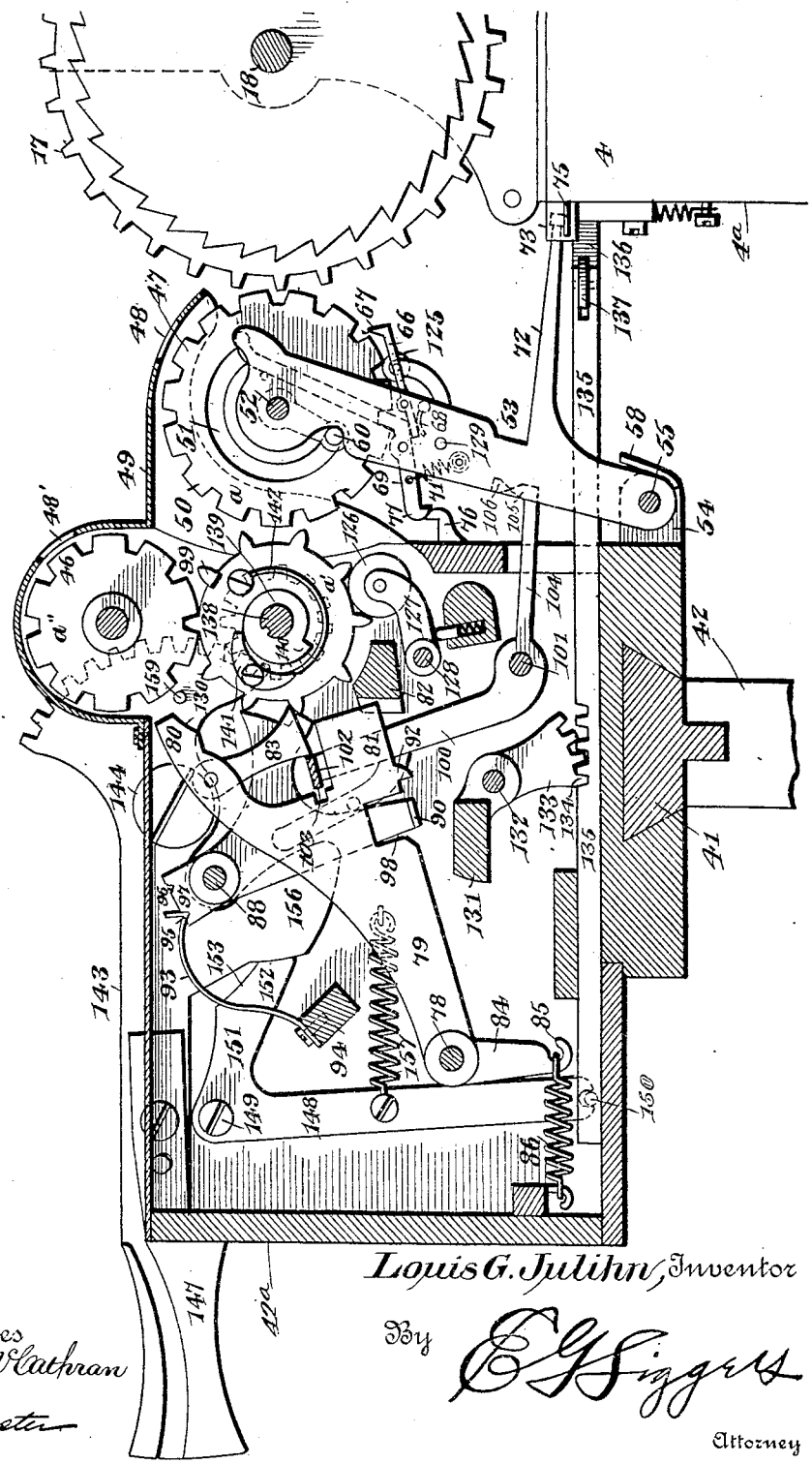

Fig. 7 is another view of the same character, showing the parts in the positions they assume during the movement of the item register from the total register to the actuator, the resetting yoke of the item register having returned to normal position, and the combined transfer-lock and dog-shifter being shown operated to unlock the transfer mechanism and to rotate the transfer dogs to their operative positions.

Figure 8:
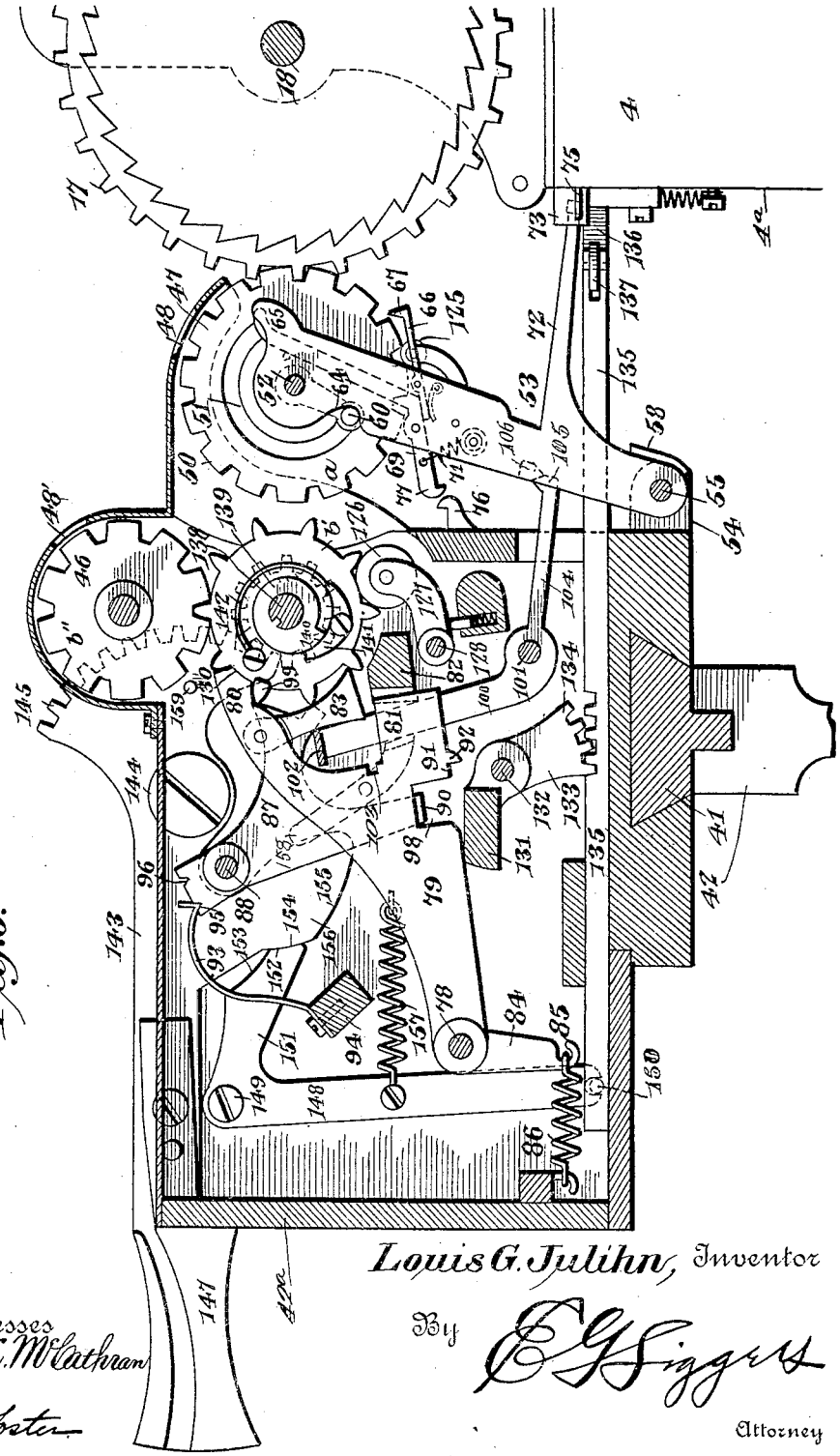

Fig. 8 is another view of this character after the item register has completed its forward movement and after the transfer mechanism has operated.

Figure 9:
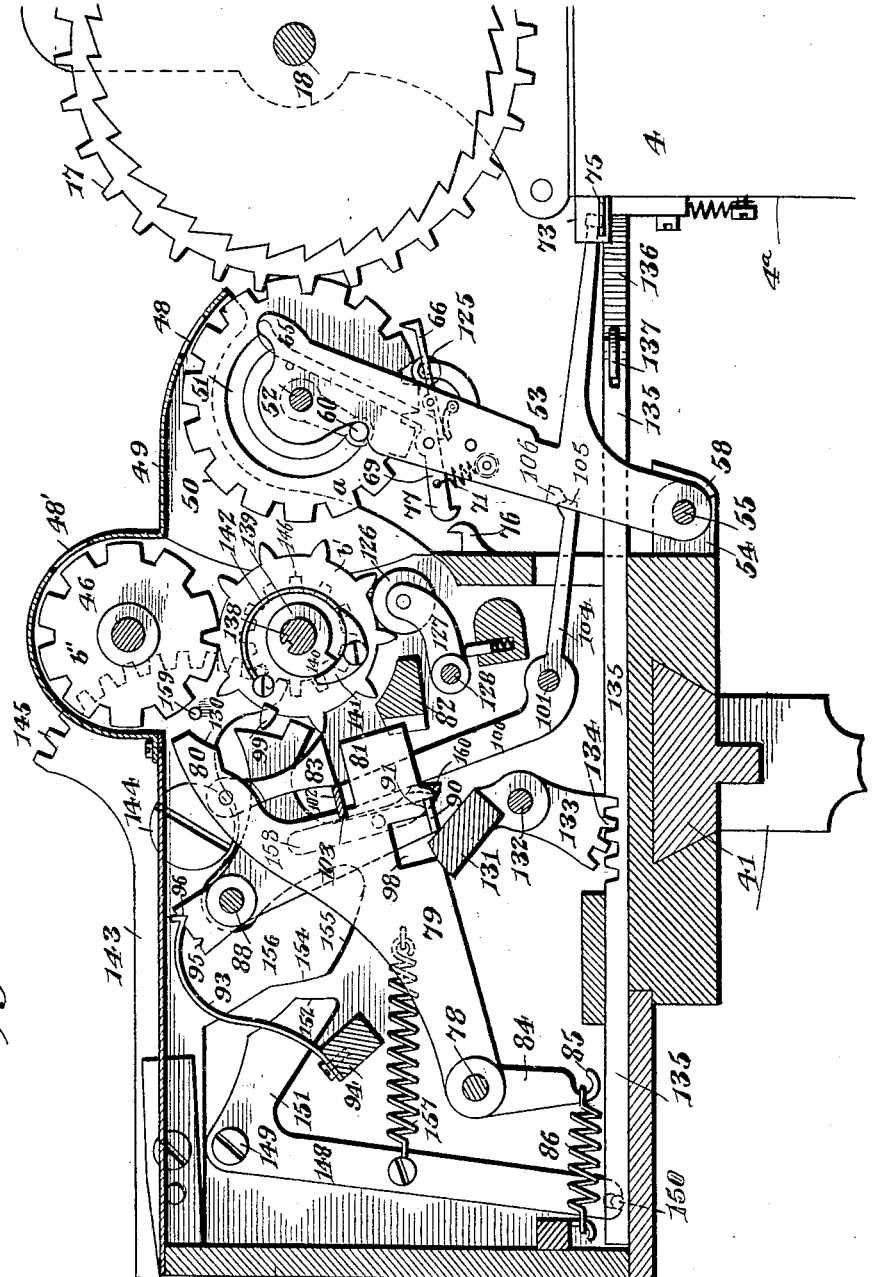

Fig. 9 is a similar view showing the transfer mechanism just as it has been reset by the retraction of the carriage after the transfer of a number from the item register to the total register.

Figure 10:
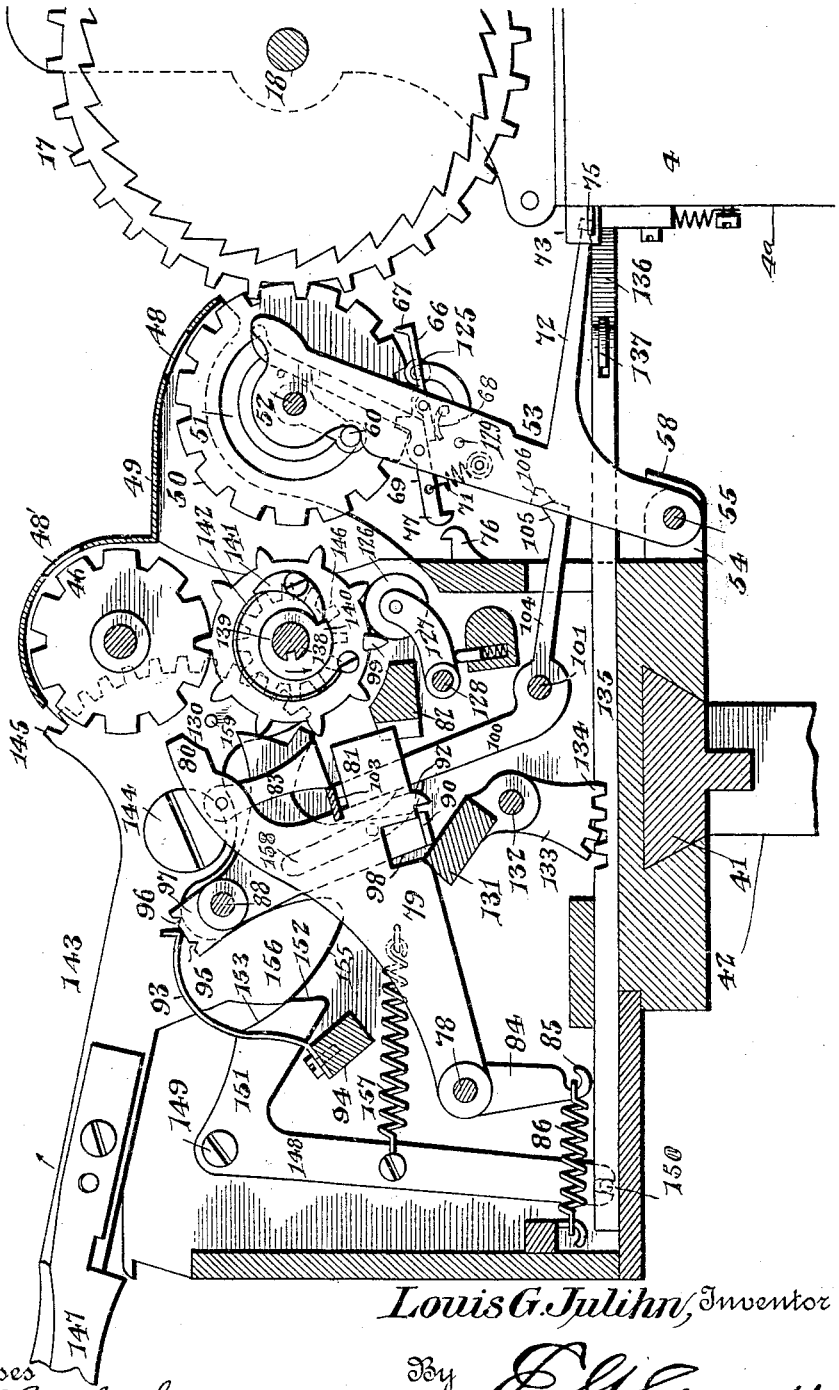

Fig. 10 is a similar view, showing the transfer mechanism in the act of being reset by the initial upward movement of the resetting lever preparatory to the resetting of the total register.

Figure 11:
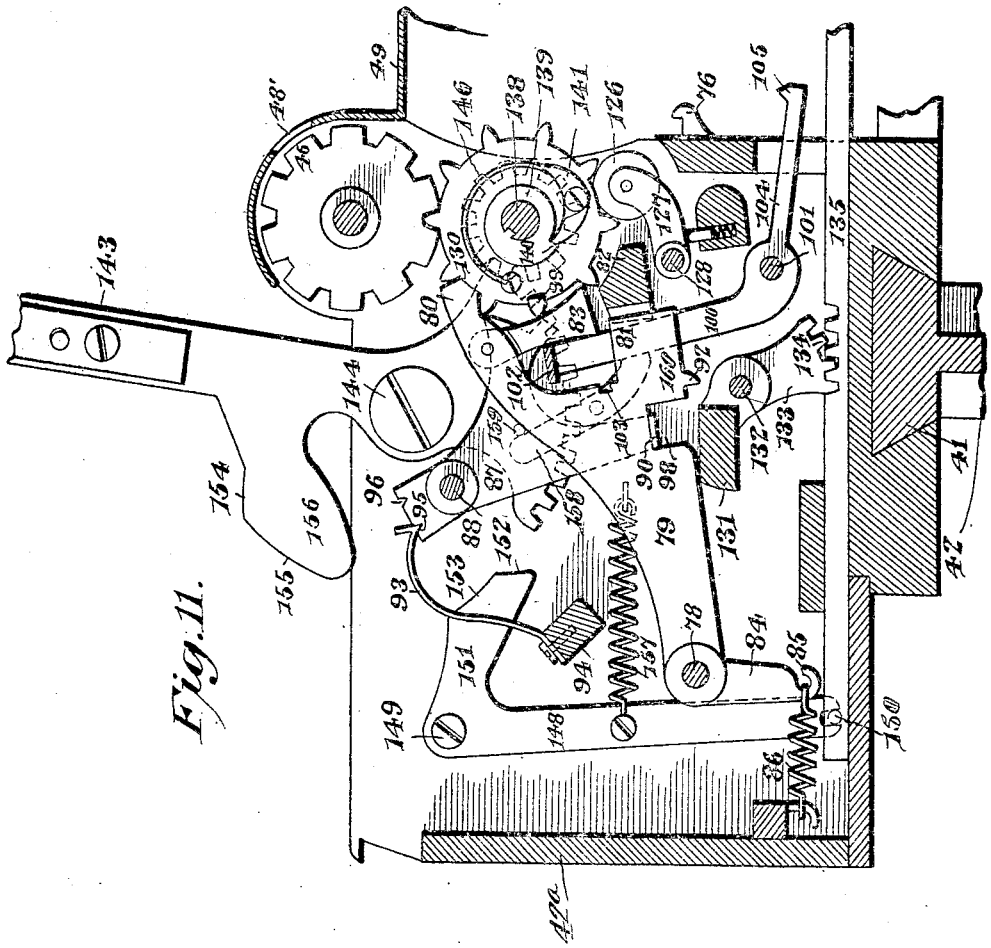

Fig. 11 is a sectional elevation of the total register, showing the parts in the positions assumed when the digit carriers have been reset.

Fig. 11$^a$ is a detail perspective view of the latch lever which holds the two registers in coöperative relation during the transfer of a number from one to the other.

Fig. 12 is a sectional elevation of the total register, showing the transfer mechanism in the act of being reset by the retraction of the resetting lever.

Fig. 12ᵃ is a detail view of one of the item wheels.

Fig. 13 is a side elevation of the front portion of the computing device and a portion of the actuator and the typewriter carriage, the item register being in position to receive a number.

Fig. 13ᵃ is a detail view of the overthrow yoke of the item register.

Fig. 14 is a view similar to Fig. 13, but showing the item register moved back to the total register and the motor lock operated to release the motor.

Fig. 15 is a diagrammatic detail elevation, showing the arrangement of cams on the carriage.

Figs. 15ᵃ, 15ᵇ and 15ᶜ are diagrammatic detail views illustrating the operation of the cams for causing either the forward or backward movement of the typewriter carriage subsequent to the printing of a number, to move the item register back to the total register preparatory to the transfer of the number to the total register.

Fig. 16 is a detail view, showing a modified construction including a series of cams for shifting the item totalizer during various periods of the retractile movement of the typewriter carriage.

Fig. 17 is a front elevation of the computing device including the two totalizers with the front portion or hood of the casing in section.

Fig. 18 is a transverse vertical section through the total register on the line 18ˣ—18ˣ of Fig. 13.

Figure 3:
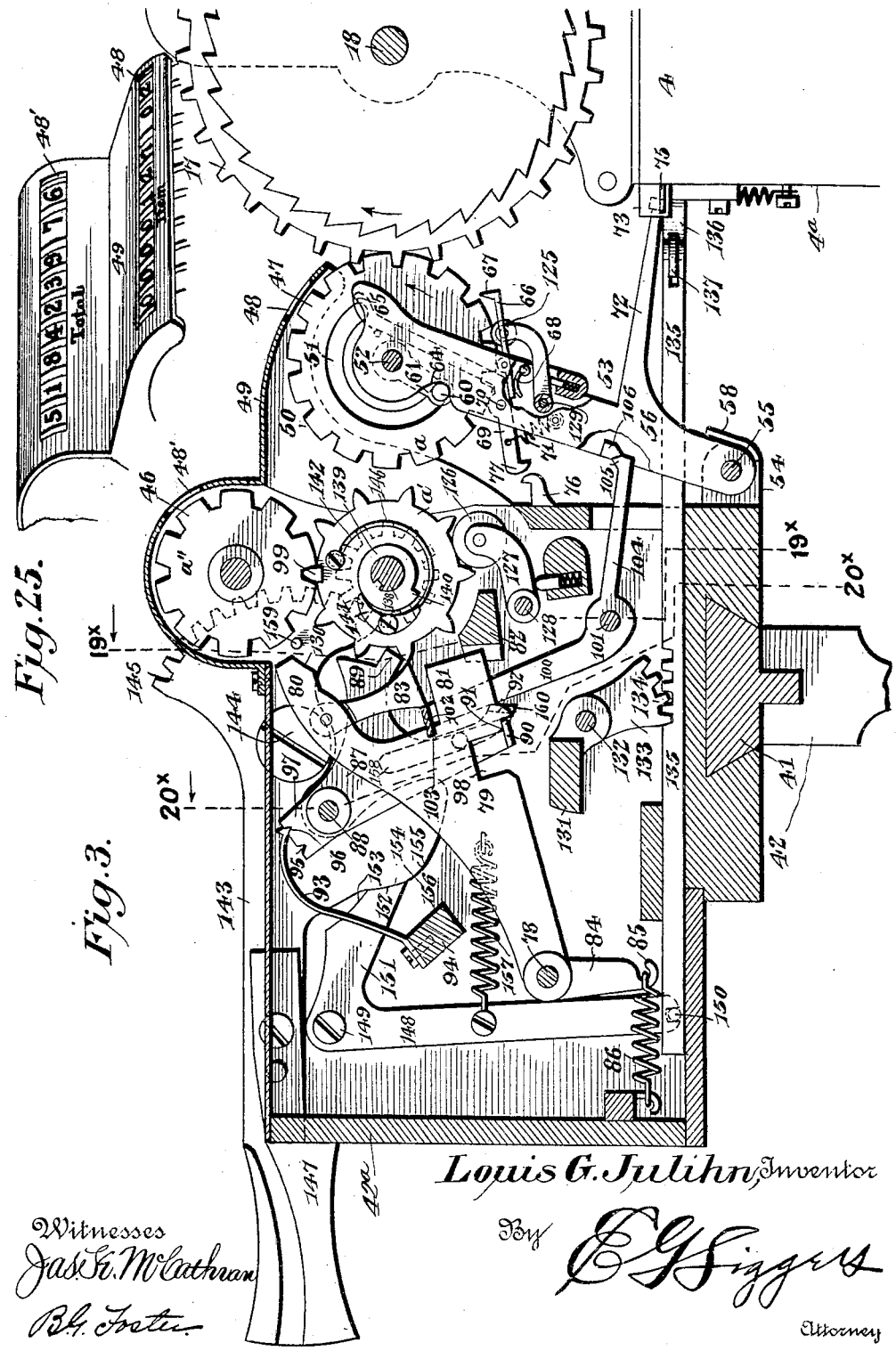
Fig. 3 is a sectional elevation of the computing device proper and a portion of the typewriter carriage and master actuator, the various parts being in the positions they normally assume preparatory to the writing of a number.

Fig. 19 is a sectional view on the line 19ˣ—19ˣ of Fig. 3.

Fig. 20 is a similar view on the line 20ˣ—20ˣ of Fig. 3.

Fig. 21 is a detail perspective view of the transfer lock.

Fig. 22 is a front elevation of the computing device with the item register in section.

Fig. 23 is a detail view of the item carrier and some of the associated parts, and Fig. 24 is a detail view of the resetting yoke and error key of the item register.

Fig. 25 is a detail perspective view of a portion of the computing device, showing the manner in which an item and the previously computed total are exhibited.

Fig. 26 is a detail view, showing the relation of the rack bar 135 and the cams or actuators 136.

*General organization of the machine.*

In the illustrated embodiment of the invention, the general organization of the machine includes a typewriter of the flat platen type, and known to commerce as the Elliott-Fisher billing machine. On the frame of this typewriter is supported a computing device which is adjustable transversely to dispose it in position for use with reference to a column located at any desired point on the work sheet upon which the numbers to be included in the computation are recorded by the typewriter in the usual manner.

The computing device includes two registers, one for the total and the other for the individual items or numbers. The total register includes a series of digit carriers or number wheels occupying different denominational positions, corresponding to the denominational orders of the column, and transfer or carrying mechanism including transfer levers and transfer selectors, whereby the value accumulated upon any denominational member will be transferred to the member of next higher order when the limit of value of the member first named is reached. The item register includes a series of digit carriers or item wheels corresponding in number and denominational position to the digit carriers of the total register, but having no transfer or carrying mechanism. The item register is mounted on a movable item carrier and is normally located in an advanced position and out of coöperative relation with the total register.

On the carriage of the typewriter is mounted a master wheel intermittently rotatable in one direction only by any numeral key of the typewriter, through the medium of operating connections, whereby the extent of rotary movement of the master wheel will correspond to the value of the particular numeral key depressed. As the typewriter carriage moves laterally to space the digits printed in a line, the master wheel is shifted laterally to engage the successive wheels of the item register. Therefore, the depression of a key to cause the printing of a digit in a given denominational position, will cause the item wheel of corresponding denominational position to be rotated a number of increments corresponding to the value of the digit printed. Thus, as a number is printed on the work sheet, such number will be set up on the item register and exhibited to the operator. If the number exhibited is erroneous, the operator manipulates an error key, which restores the item wheels to zero. The operator then erases the number erroneously printed and prints the correct number, which will be displayed as before, upon the item register. Having assured himself of the correctness of the number by an inspection of the item register, the operator will either retract the carriage to begin the writing of a new number, or will advance the carriage beyond the column for the purpose of printing other matter. In either event, the movement of the carriage, whether it be forward or backward, will automatically shift the item register back to the total register. The item register will now be automatically locked in coöperative relation with the total register, and a transfer motor will be automatically set in motion to restore the item wheels to zero. As the item wheels thus rotate, they operate the number wheels of the total register for the purpose of adding the value of the new number to the amount previously accumulated upon the total register. If, during the operation of the total register by the item wheels, any wheel of the total register moves from 9 to 0, thus reaching the limit of its value, said wheel will operate one of a series of transfer selectors.

When the adding wheels have been reset to zero, the transfer motor will be automatically stopped, and the item carrier will be automatically released and moved forward from the total register to the operative plane of the master wheel. Incidental to this forward movement of the item carrier, the transfer levers of the total register will be automatically unlocked and a deferred carrying operation will be effected by the operation of those transfer levers whose selectors have been operated. The item register will now be in its forward or item receiving position and a new item may be set up thereon as it is recorded on the work sheet. Then when the typewriter carriage is retracted to begin a new line, the transfer or carrying mechanism of the total register is automatically retracted or reset so that by the time the item register has moved into engagement with the total register, the latter will be in condition to have the new item transferred thereto.

*The general construction of the typewriter.*

Proceeding now with a more detailed description of the machine, it may be stated that the typewriter here shown is of ordinary construction, and is known to commerce as the Elliott-Fisher billing machine, exemplified in Patent No. 573,868 to R. J. Fisher. In this machine a stationary flat platen 1 is equipped with tracks or guides 2 upon which a machine frame 3 travels longitudinally or in the direction of line spacing. The line spacing of the machine is effected by line spacing mechanism 3ª, indicated generally in Fig. 2.

Mounted to travel on the frame 3 transversely of the platen, or in the direction of letter spacing, is a carriage 4 advanced to the right by carriage propelling mechanism including spring drums 5 mounted on the frame 3 and connected to the carriage by tapes 6. The movement of the carriage 4 to the right is controlled by escapement mechanism 7 operated by either the numeral keys 8 or the letter keys 9 of the typewriter through the medium of yokes 10. The escapement 7, yokes 10, (one only of the latter being shown) and certain other parts of the typewriter are mounted in a casing 4ª constituting the upper portion of the carriage 4. The movable carriage 4 also supports the printing mechanism proper.

Pendent from the carriage casing 4ª is a type ring 11 upon which are pivotally mounted a series of downwardly swinging type bars 12 connected by draw-wires 13 to key levers 14 fulcrumed in the casing 4ª and connected to the stems 15 of the keys 8 and 9. The machine is also equipped with tabulating mechanism 16, indicated generally in Fig. 2, and fully described and shown in Patent No. 666,762 issued to C. F. Laganke. The purpose of this tabulating mechanism is to effect the release of the typewriter carriage and its free movement under the impulse of the carriage propelling mechanism until arrested by one of a series of tabulator stops which are adjustable on the machine frame according to the desired locations of the columns.

*The actuator and its operating connections.*

Figure 2:
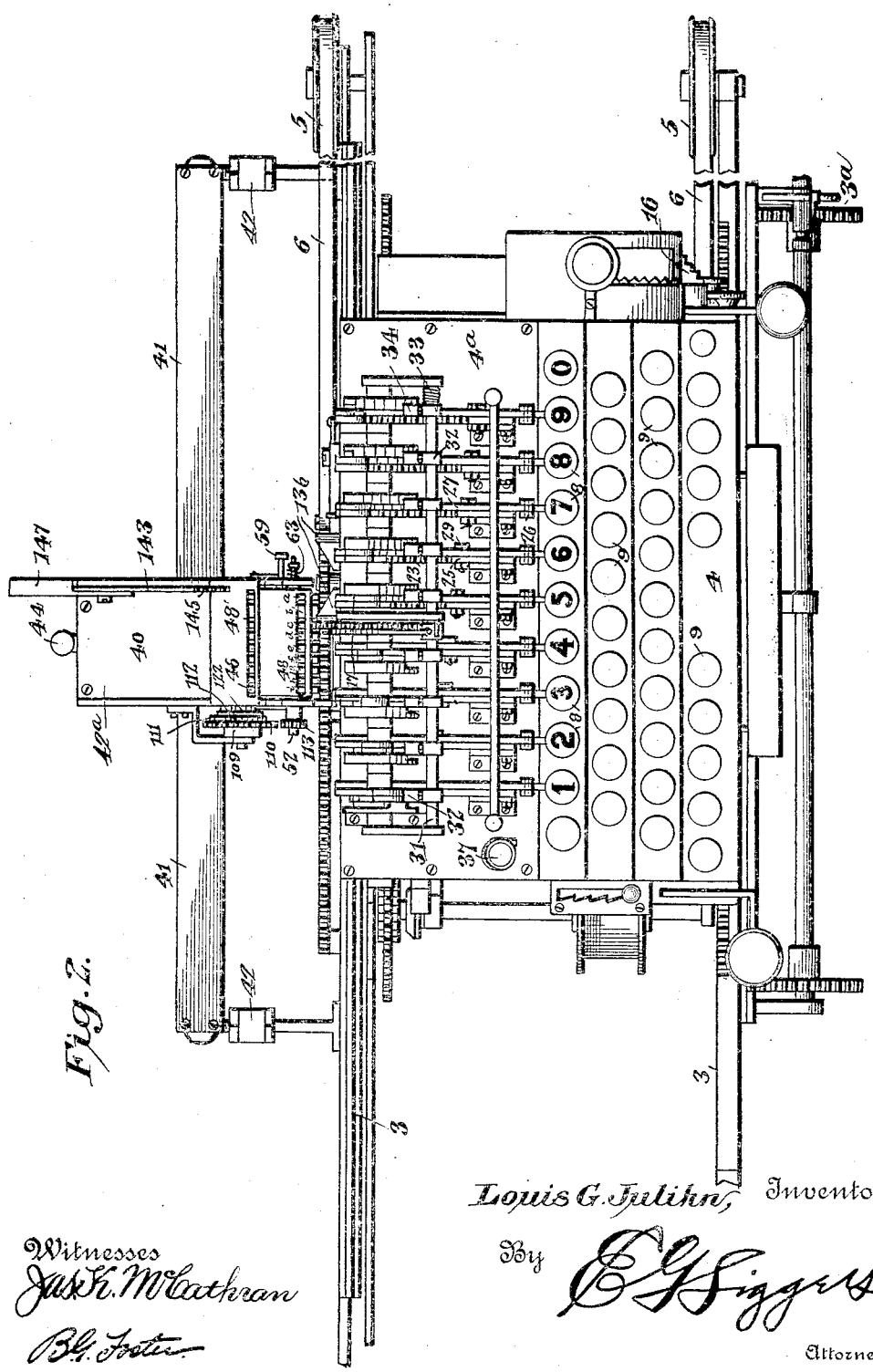
Fig. 2 is a plan view of the same on a somewhat smaller scale.

The actuator or master wheel 17 of the computing device, to be described, is fixed to a comparatively long driving shaft 18 mounted in suitable brackets 19 rising from the cover 4ᵇ of the carriage casing 4ª adjacent to the rear side of the carriage. Fixed to the shaft 18 are a series of driving ratchets 20, each adapted to be engaged by one of a series of driving pawls 21 carried by a series of driving arms 22 each having a toothed segment 23 engaged by a toothed segment 24 formed at the rear end of a third-class lever 25 fulcrumed at its front end upon the carriage, as indicated at 26. Each lever 25 is operated, for the purpose of swinging its driving arm, by a second-class lever 27 fulcrumed at its rear end, as indicated at 28. The levers 27 are connected at their front ends to the numeral keys 8 for actuation by the latter, and an operative connection between each lever 25 and the adjacent lever 27 is effected by means of a pin 29 extended from one lever and playing within a comparatively short longitudinal slot 30 in the other lever. As the stroke of each key, regardless of its value, is the same, and as a positive connection is effected between each key and one of the levers 27, each of said levers will obviously have the same extent of movement or stroke. Therefore, as it is necessary for the several levers 25 to have different strokes, according to the progressive values of the keys, the several slot and pin connections are disposed in graduated arrangement, as shown in Fig. 2. By this arrangement, the depression of any key will cause the driving arm operated thereby to be moved a distance proportionate to the value of the key, the pawl carried by the arm engaging the adjacent driving ratchet and imparting a corresponding rotary movement to the driving shaft 18 and master wheel 17. When the key is allowed to rise, the escapement 7 will allow the carriage propelling mechanism to advance the carriage to the next lower denominational position of the column and the driving arm will swing back to its normal position without effecting reverse rotation of the driving shaft or master wheel, since the driving pawl 21 will move back idly to its normal position.

Mounted in the bracket 19 is a universal check bar 31 provided with a check arm 32 disposed to engage the master wheel 17, but normally retained out of engagement therewith by a spring 33 coacting with the bar 31. Also extended from the bar 31 are a series of arms 34 each of which is disposed opposite a driving arm 22, as shown in Fig. 2. As a driving arm completes its movement, it strikes one of the arms 34 and thus rocks the universal bar 31 to move the check arm 32 into engagement with the driving wheel 17 to positively arrest the movement of the latter at the proper point.

The connection between the levers 27 and the numeral keys is effected by means of links 35 provided with lugs 36 which extend into notches in the pins 8ª projecting from the key stems 15. In order to disconnect the operating connections of the computing device from the keys, a total key 37, shown in Fig. 2, is connected to a yoke 38 which engages slots 39 in the lower ends of the links 35, a suitable detent (not shown) serving to hold the total key in either of its positions.

While I have shown and described with some particularity, the operating connections of the master wheel, it should be understood that I make no claim to this specific construction. In fact, while the operating mechanism here shown is considered preferable, any well known or approved mechanism adapted to serve a like purpose may be substituted therefor in carrying my present invention into effect.

The computing device.

Figure 1:
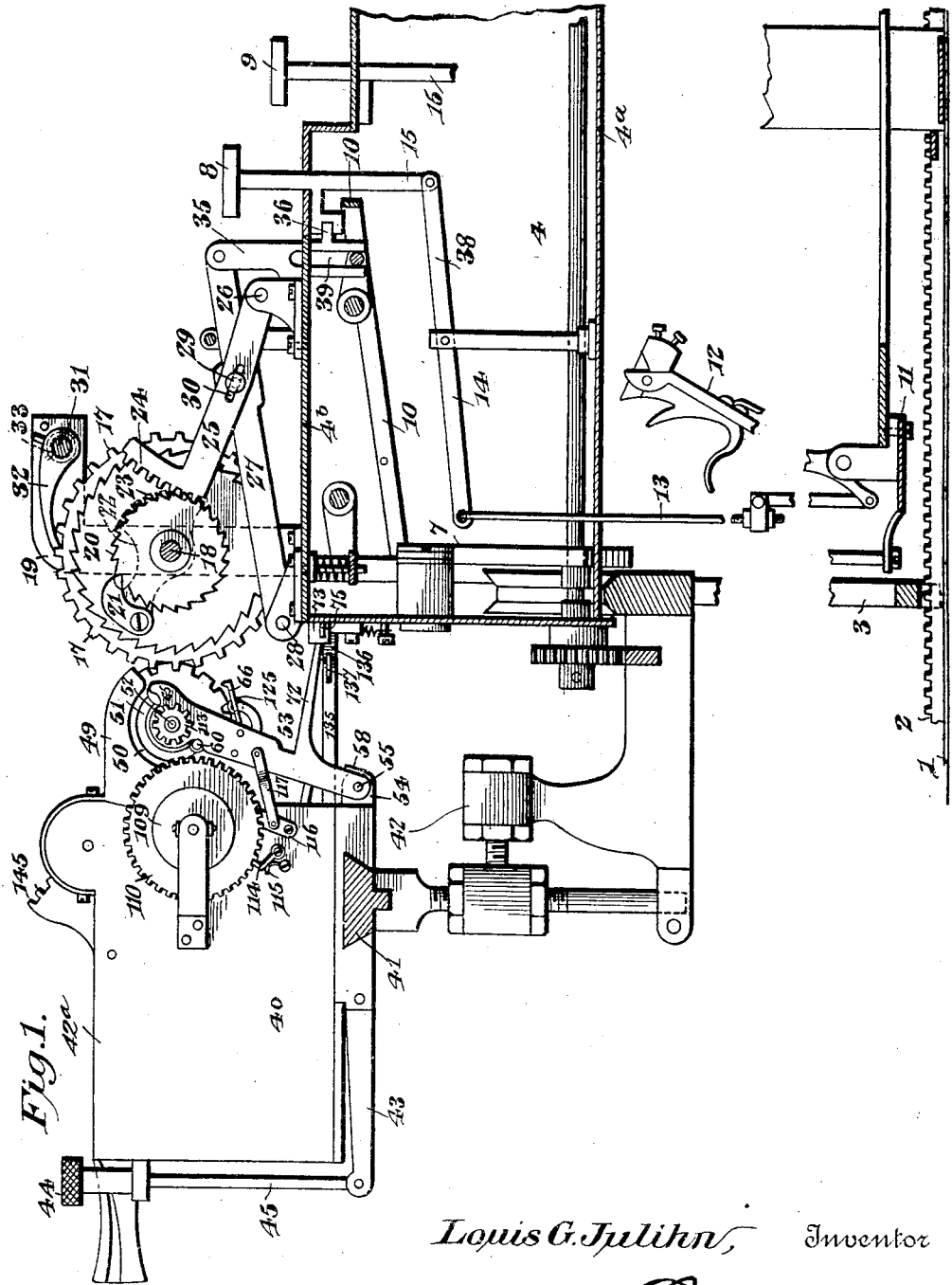
Figure 1 is a sectional elevation of my combined typewriting and calculating machine, portions of the typewriter structure being broken away.

The computing device comprehends that organization whereby the operation of the actuator serves to effect the registration of individual numbers and totals. The computing device, indicated as a whole by 40, is adjustably mounted upon a register bar 41 supported in rear of the carriage by supporting brackets 42 extending rearwardly from the upper portion of the frame 3 and sustaining the bar 41 in an elevated position, as shown in Fig. 1. The register bar 41 extends transversely of the platen, and being carried by the frame 3, is stationary relative to the carriage 4. The casing 42ª of the computing device is fitted to the register bar 41 and is shiftable along the latter to dispose the computing device in various positions to facilitate its use in connection with columns variously located on the work sheet, the casing being retained in the position to which it is adjusted, by the locking lever 43 engaging the bar 41 and operated by a thumb nut 44 through an intermediate push rod 45. The computing device 40 includes in its organization a total register 46, and an item register 47 located between the total register and the master wheel.

The item register.

The item register is operated directly from the actuator or master wheel 17 to set up successively, in proper denominational position, the several component digits of a number as they are printed, the number being exhibited opposite a sight opening 48 in the forwardly extended hood 49 of the casing 42, see Fig. 3. This register includes a series of co-axial item wheels 50 preferably, though not necessarily, nine in number, and lettered $a$, $b$, $c$, $d$, $e$, $f$, $g$, $h$, $i$, and best shown in Figs. 12ª, 17 and 22. Each of the item wheels is provided with a toothed periphery bearing upon the end faces of nine consecutive teeth, the digits "0" to "9" inclusive, designed to be successively presented before the sight opening 48 as the wheel is rotated. Each item wheel is also provided with an arcuate slot 51 concentric with the axis of the wheel, as shown in Fig. 12ª, the purpose of which slot will hereafter appear. The several item wheels 50 are independently rotatable on a shaft 52 journaled at the upper end of what may be termed the item carrier 53 in the form of a frame pivotally connected at its lower end to lugs 54 extended forwardly from the bottom of the casing 42, see Figs. 3, 17, 22 and 23. The pivotal connection is effected by means of a cross bar 55 journaled in the lugs 54 and connecting the side arms 56 of the frame constituting the item carrier 53. The carrier 53 is urged forwardly to the position shown in Fig. 3 by a spring 57 encircling the shaft 55, see Fig. 22, and secured at its opposite ends to said shaft and a lug 54, respectively.

The stops 58 extended from the stationary lugs 54 serve to limit the forward movement of the carrier 53. When the item carrier 53 is in its forward position, shown in Fig. 3, the item wheels 50 are located in the plane of operation of the master wheel 17, so that, whenever the typewriter carriage is moved to a position which will present the printing point of the machine opposite the column to be added, the master wheel will be opposite to and in engagement with one of the item wheels, and will be advanced into engagement with successive item wheels as the printing point of the typewriter advances to successive denominational positions of the column. When a digit is printed in a given denominational position in the column, the master wheel, operating in the manner heretofore described, will rotate the item wheel 50 of corresponding denominational position in the direction of the arrow in Fig. 3, and as the degree of such movement corresponds to the value of the digit printed, the item wheel will display such digit opposite the sight opening 48. Other item wheels will be similarly operated as the digits are printed in different denominational positions, and as a consequence, the printed number will be registered on the item register and exhibited to the operator.

*The error key for resetting the item register.*

As the numbers set up on the item register are in full view of the operator, he is enabled to instantly detect the commission of an error, because simultaneously with the printing of the digits, they are displayed before the sight opening 48. As soon as an error is discovered, the operator proceeds to erase the erroneous digit from the work sheet and to reset the item register to zero in order that the correct number may be printed and registered. To effect this resetting of the item wheels to zero, I provide an error key 59, a single movement of which resets all of the item wheels, regardless of the varying positions to which they may have been moved by the actuator. The error key 59 is formed at the right hand end of a resetting bar 60 extended through the arcuate slots 51 of the several item wheels and carried by a pair of swinging arms 61 fixed to the shaft 52 which supports the item wheels. The arms 61 are opposed to the inner sides of the side members 56 of the carrier 53, as shown in Figs. 3, 17 and 22, and forming with the bar 60, a resetting yoke 62.

Normally, the resetting yoke is retained in the position shown in Fig. 3 by a spring 63 mounted on the shaft 52 (see Fig. 17) and yieldingly retaining the bar 60 in contact with the rear edges of the members 56 which are preferably formed with recesses 64 to receive the bar. It will be obvious that normally the upper ends of the several slots 51 in the item wheels 50 are in alinement and that as each item wheel is rotated by the master wheel, the upper end of its slot will recede in proportion to the movement of the wheel. Therefore, in order to reset the wheels, it is simply necessary to manipulate the error key 59 for the purpose of swinging the resetting bar 60 upwardly and forwardly. As the movement of the resetting bar continues, it will pick up the several item wheels as it arrives in position to contact with the upper ends of their slots, and by continued movement, the bar will effect the reverse rotation of the wheels until they arrive in the zero position.

For the purpose of limiting the movement of the resetting bar, the side members 56 of the item carrier 53 are formed at their upper ends with stops 65 which arrest the movement of the bar 60 as the item wheels reach their completely reset positions. As soon as the resetting yoke has performed its function of resetting the item wheels, the error key is released and the spring 63 immediately returns the yoke to its normal position to prevent the bar 60 from interfering with the subsequent operation of the item wheels by the master wheel.

*The means for preventing overrunning of the item wheels when reset.*

To prevent overrunning of the item wheels, due to the impetus gained by them, when the error key is manipulated swiftly, I provide an overthrow dog 66 having the form of a lever fulcrumed in the carrier 53 and provided with a flange 67 extended across the entire series of item wheels and movable into the interdental spaces thereof. The dog 66 is normally held out of engagement with the item wheels by a spring 68, but is designed to be moved into engagement with the wheels by a latch lever 69. The lever 69 is fulcrumed at one side of the item carrier, as indicated at 70, and bears at a point in advance of its fulcrum, upon the rear short end or arm of the transfer dog 66.

The front end of the latch lever 69 extends upwardly and its rear edge is located a short distance behind the rear edge of one of the stops 65. When the bar 60 is swung around in the manner heretofore described, to reset the item wheels, it will engage the upper end of the lever 69 just before the wheels reach their completely reset positions. As the bar continues to move, it will swing the upper end of the lever 69, thus causing the latter to depress the rear end of the overthrow dog 66, the flange 67 of which will be thrown into engagement with the wheels to prevent overthrow of the latter. As soon as the resetting yoke begins to swing back to its normal position under the impulse of the spring 63, the lever 69 will be released and will be drawn back to its normal position by a spring 71, the dog 66 being simultaneously withdrawn from the wheels by its spring 68.

*The means for shifting the item register.*

Up to this point it has been assumed that the number registered on the item register is erroneous, and that the item wheels are to be reset without removing the item register from its normal or forward position. When, however, the correct number has been recorded and registered, it is intended to automatically shift the item register rearwardly for the purpose of removing it from the operating plane of the master wheel and into coöperative relation with the total register for the purpose of transferring the value of the number or item thereto.

Figure 4:
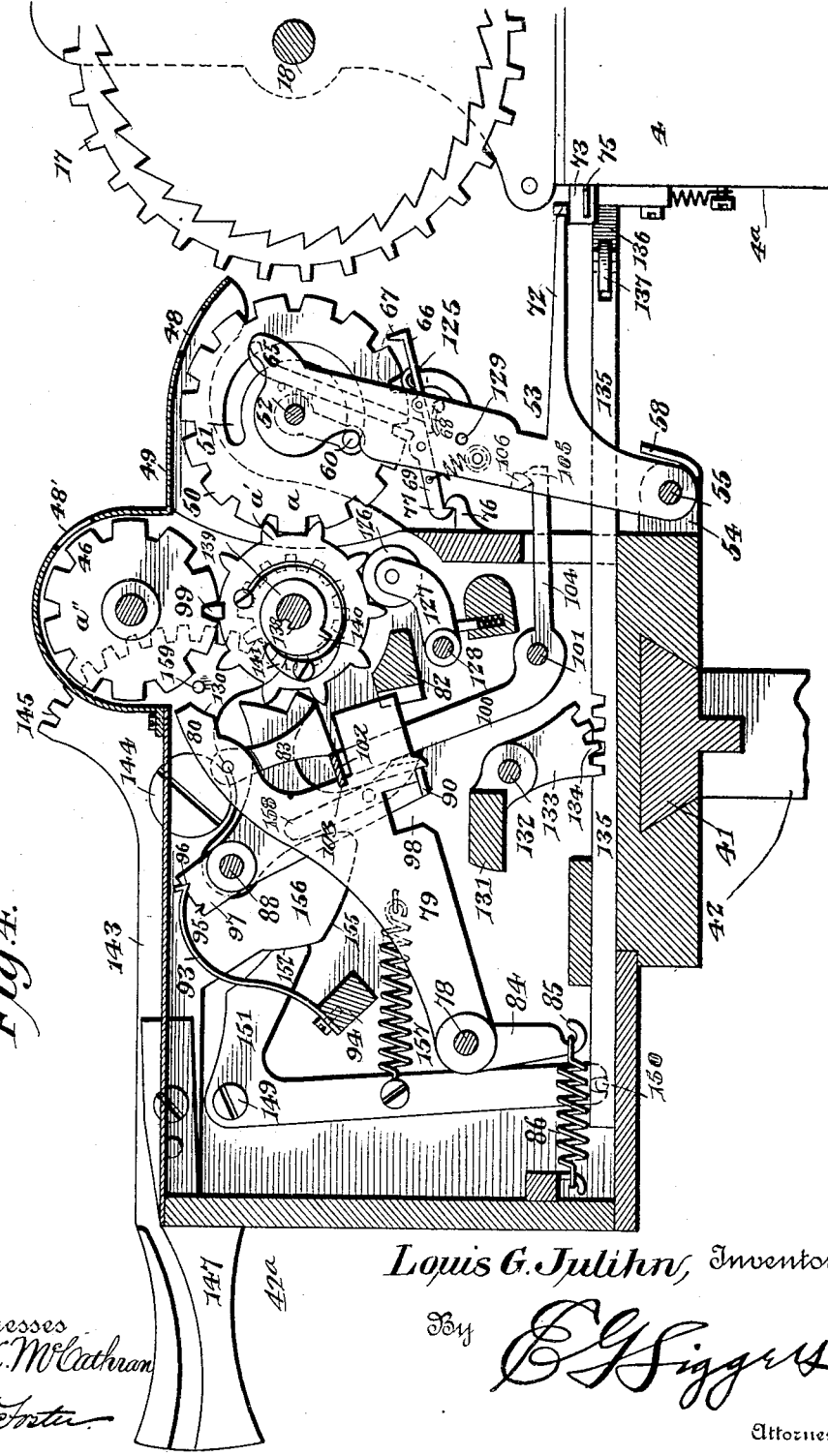
Fig. 4 is a similar view, showing the positions assumed by the parts after a number has been set up on the item register and said register moved back into position to operate the total register.

To accomplish this automatic shifting of the item register, I provide one of the side members 56 of the carrier 53 with a forwardly extending arm 72 disposed to coöperate with cams 73 and 74 mounted on the rear wall of the carriage 4. These cams are in the form of oppositely inclined plates pivoted at their upper ends to the carriage and having their lower ends resting upon stops 75, see Figs. 15 to 15$^c$ inclusive and Fig. 16. The cam 73 is so arranged that when the master wheel 17 is opposite the item wheel of lowest order, to-wit, the wheel $a$, as shown in Fig. 15, said cam will be in engagement with the front end of the arm 72. Therefore, as the carriage moves to the right (or the left when viewed from the rear as in Figs. 15 to 15$^c$ and Fig. 16), and out of engagement with the item register, the cam 73 will ride under the arm 72 and will elevate the latter, as shown in Fig. 4, thus swinging the item register back from the operating plane of the master wheel, and into coöperative relation with the total register. If, instead of permitting the advance of the carriage beyond or to the right of the column, the operator immediately retracts the carriage to begin the printing of a new number in the column, the arm 72 will be operated by the cam 74, as indicated in Fig. 15$^a$. These cams 73 and 74 will thus be seen to constitute means whereby movement of the typewriter carriage in either direction, after the registration of a number on the item register, will cause the automatic shifting of the item register from its normal position to the total register.

The cams 73 and 74 are mounted to swing in the manner heretofore stated in order to cause them to ride idly over the arm 72 when the carriage is moved in a direction contrary to that which causes the effective operation of the cam. For instance, in Fig. 15$^b$ the carriage is shown moving to the right. When this movement of the carriage presents the cam 74 to the arm 72, the cam will swing up and move past the arm without operating the latter, which, however, will be operated as soon as the carriage has advanced far enough to present the cam 73 under the arm. In Fig. 15$^c$ the positions assumed by the parts during the retraction of the carriage are shown. In this figure the cam 73 is shown to be moving idly over the arm 72 which, however, will be elevated to swing the item carrier 53 as soon as the continued retraction of the carriage presents the cam 74 to the arm.

As shown in Fig. 15, the cam 73 is disposed at such an inclination that a single letter space movement of the typewriter carriage will effect the backward shifting of the item carrier. It may be desirable, however, to diminish the pitch of the cam in order to reduce the resistance opposed by it to the movement of the carriage. In that event, of course, the cam would act during two or more letter space movements of the carriage. The arrangement shown, however, is designed to effect the prompt shifting of the item register, and if necessary, the resistance opposed to the movement of the carriage by the cam 73 and the parts coacting therewith will be compensated for by increasing the power of the carriage propelling mechanism to effect which it is merely necessary to wind the spring drums 5 more tightly. The cam 74 is somewhat longer than the cam 72 and is set at a less abrupt angle. Therefore, the cam 74 acts during the retractile movement of the carriage for the distance of two letter spaces, although the angular disposition of the cam may be changed, as desired.

In Fig. 16 I have shown a modification which embraces the idea of employing a series of cams 74 instead of a single cam. It will be seen by reference to Fig. 15, that whenever a single cam 74 is employed, it is necessary to move the typewriter carriage a sufficient distance to the right to present the master wheel opposite the item wheel of lowest order before the cam 74 and the arm 72 are disposed in position to permit the operation of the arm by the cam. If, however, the digits printed in the column are all of comparatively high denomination, it may not be desirable to have the master wheel traverse the entire series of item wheels. On the contrary, it may be desirable to operate the three highest item wheels only and to then retract the carriage to begin the writing of a new number. In order to provide for this contingency, the several additional cams 74, shown in Fig. 16, are so disposed that the arm 72 may be operated during any one of several periods in the retractile movement of the typewriter carriage. Obviously, also, this same principle may apply to the duplication of the cam 73.

If desired, the cams 73 and 74 may be retained in inoperative positions by removing the stop pins 75 from the positions shown in Fig. 15 and inserting them in openings 75$^a$, sufficiently elevated to retain the cams above the normal plane of the arm 72, thus preventing the cams from contacting with the arm during the movement of the typewriter carriage.

*The means for automatically locking the item register in its shifted position.*

When the item carrier 53 supporting the item register is swung back by the movement of the carriage in the manner just described, it is automatically locked in position to operate the total register. The locking means includes a keeper 76 projecting from the front of the casing 42 and engaged by a beak or hook 77 formed at the rear end of the latch lever 69. As the item carrier 53 moves back, the hook 77 rides up over the keeper 76 and is immediately drawn down behind the latter, as shown in Fig. 4, to prevent accidental displacement of the item register until the number set up on the latter has been completely transferred to the total register in a manner to be hereinafter explained. The movement of the latch lever 69 necessary to cause its engagement with the keeper 76 will also cause the overthrow dog 66 to be moved up into engagement with the item wheels 50 and thus prevent possible dislocation of the latter as they are moving into engagement with the total register.

*The total register.*

We now come to the consideration of the total register, which mechanically computes and registers the total of the several numbers or items transferred to it from the item register. The elements of this register are mounted in the casing 42 and include a series of denominational members $a'$, $b'$, $c'$, $d'$, $e'$, $f'$, $g'$, $h'$ and $i'$, corresponding in denominational position to the item wheels and likewise representing progressive denominations, as for instance, hundredths, tenths, units, tens, hundreds, thousands, ten-thousands, hundred-thousands, and millions, the number wheel $b$ being preferably of double width, in order to accommodate the decimal space. These denominational members are in the form of toothed wheels, as shown, and while they may directly carry and display the digits by means of which the result of the computation is exhibited, they preferably engage and operate a series of digit carriers $a''$, $b''$, $c''$, $d''$, $e''$, $f''$, $g''$, $h''$, and $i''$, corresponding thereto in denominational position and each bearing the digits "0" to "9" inclusive equidistantly spaced upon its periphery. A single digit on each of these wheels $a''$, $b''$, etc., is exhibited before the sight opening 48' in the top of the casing 42. These wheels may therefore be said to constitute the registering members of the total register, since the exhibition, in different denominations, of the digits carried by these wheels, effects the registration of the result or total of a given computation.

*The carrying or transfer mechanism.*

In this type of machines it is necessary to provide means whereby, when the value accumulated upon any wheel reaches the limit of the denominational value of such wheel, such value will be automatically transferred or carried to the wheel of next higher order or denomination. Thus assuming the units wheel to be given nine increments of movement to cause the presentation of the digit "9" opposite the sight opening, the next or tenth increment of movement will present the "0" on said wheel before the opening, and the tens wheel must therefore be advanced a single increment or step to present the digit "1" before the sight opening, the presentation of the digits "0" and "1" in the units and tens orders or denominations, effecting the registration of the number "10", which is the limit of value of the units denomination and the unit of value of the tens denomination. It will, of course, be understod that as the limit of value of each denomination is ten, and as the unit of value of each denomination is one, the above remarks apply with equal force to the relation of any two wheels of the series.

The carrying or transfer mechanism is that organization whereby the transfer of value from any wheel to the wheel of next higher order is effected. In rear of the primary wheels $a'$, $b'$, etc., is disposed a transverse supporting rod 78 upon which are fulcrumed a series of independent transfer levers 79, one of these levers being arranged opposite each of the primary wheels with the exception of the wheel $a'$ of lowest order, for which no lever is provided. The transfer levers are of irregular form, and each is provided at its front end with a locking arm 80 and a guide arm 81, the latter being disposed a considerable distance below the arm 80 and movable in one of a series of guide openings or notches in the guide bar 82 extended across the casing 42, see Fig. 3. Pivoted to the locking arm 80 of each transfer lever, and depending therefrom, is a transfer dog 83 the lower end of which is designed to extend over and engage one of the peripheral teeth of the adjacent primary wheel, the front face of the dog being curved longitudinally so that that part of the dog which engages the primary wheel has the form of a projection or tooth.

The rear arm 84 of each transfer lever 79 extends downwardly from the fulcrum thereof, as shown in Fig. 3, and terminates in a hook 85 to which is attached one end of a spring 86 having its opposite end attached to the rear wall of the casing. One of these springs 86 is provided for each of the transfer levers and constitutes a carrying or transfer motor which tends constantly to swing the transfer lever for the purpose of advancing a primary wheel through the medium of the transfer dog 83 carried by the lever and extended over a tooth of a wheel, as stated.

*The transfer selecting mechanism.*

The transfer selecting mechanism coacts with the primary wheels $a'$, $b'$, etc., and the transfer levers, to determine which of the transfer levers shall operate, and includes a series of holding devices, detents, or transfer selectors 87 in the form of thin metal plates alternating with the transfer levers and mounted to swing from a bar 88 extending transversely across the casing at a point above the levers 79. One of the selectors 87 is appropriated to each transfer lever and is disposed at the right hand side thereof in order to permit a contact plate or lug 89 extended forwardly from the selector to occupy a position between two primary wheels.

The wheel at the left hand side of the selector 87 is that wheel which is disposed opposite to and arranged to be advanced by the transfer lever 79 with which the selector coacts. At the lower end of the selector 87 is located a laterally extended holding lug 90 normally disposed under the lower edge of a transfer lever and yieldingly held against the stop shoulder 92 by a spring detent 93 extended forwardly from a bar 94 disposed transversely of the casing 42. The detent 93 is arranged to engage either of two notches 95 or 96 in an upward extension 97 of the adjacent selector whereby the selector may be yieldingly retained in either of two positions.

In rear of that portion of its lower edge 91 with which the holding lug 90 is normally engaged, as shown in Fig. 3, each transfer lever is formed with a comparatively deep notch or recess 98. This notch is of sufficient width to receive the holding lug 90 so that, when the latter is moved back, opposite the notch, by the swinging of the selector 87, the front end of the transfer lever 79, unless otherwise retained, will be permitted to drop under the impulse of its transfer motor 86 for the purpose of advancing a primary wheel, and the corresponding registering wheel, a single increment or step. We have already seen that this movement of the transfer lever is designed to advance a given registering wheel or digit carrier when the wheel of next lower order has reached the limit of its value. Obviously, therefore, the operation of the selector must be effected by such wheel of lower order when the latter moves from 9 to 0, in order that the transfer lever serving the next higher wheel may be permitted to drop at the proper time. For this purpose each of the primary wheels, except the wheel $i'$ of highest order, is provided upon the left hand side face of one of its teeth with a transfer lug or projection 99 movable in a path obstructed by the contact plate 89 of the selector 87 which controls the operation of the transfer lever of next higher order or denomination. Thus as a given primary wheel moves from the "9" position (the corresponding registering wheel recording 9 at the sight opening 48') the transfer lug 99 thereof will engage the adjacent contact plate 89 and swing the selector 87 to the position shown in Fig. 5, thus bringing the holding lug 90 opposite the notch 98 for the purpose of releasing the transfer lever. Unless the transfer lever is otherwise retained in its normal position, its release by the selector will permit its transfer motor 86 to immediately act to move the transfer lever to the position shown in Fig. 8, thus causing the dog 83, carried by the lever, to move the next higher wheel a single increment for the purpose of transferring to it the value accumulated upon the wheel of lower denomination. The transfer dogs 83 are pivotally mounted in the transfer levers and normally occupy positions in rear of and out of engagement with the primary wheels $a'$, $b'$, etc., and are designed to be moved into engagement with the primary wheels at the proper time.

*The mechanism for deferring the action of the transfer or carrying mechanism.*

Ordinarily, in machines of this character, the primary wheels are operated one at a time by a master actuator, and as the operated wheel moves from "9" to "0", the transfer lever of the next higher wheel is released and permitted to operate. In this machine, on the contrary, the several primary wheels $a'$, $b'$, etc., are adapted to be simultaneously operated by the several item wheels $a$, $b$, etc., it being observed that after the item wheels have been moved back into engagement with the primary wheels, as shown in Fig. 4, all of the item wheels which have been operated by the master wheel are simultaneously restored to zero by the swinging of the resetting yoke 60, the backward rotation of the item wheels effecting the forward rotation of the primary wheels engaged by them. It will be obvious, therefore, that if a transfer lever should be permitted to operate while the primary wheel served by said lever is being positively rotated by a carrying wheel, no carrying operation would result. In other words, let us suppose that the units wheel of the total register is exhibiting 9 at the sight opening and that the other total register wheels are exhibiting 0. The item to be added to the total is 11, registered on the item register by moving the units and tens item wheels forward one increment each. To restore these item wheels to zero they must be rotated backward one increment. This will rotate the units and tens wheel of the total register one increment each. During this operation the units wheel, moving from 9 to 0, will trip the transfer lever of the tens wheel, which wheel however, is being moved from 0 to 1 by the tens item wheel. As a consequence the units wheel of the total register will exhibit 0 at the sight opening, and the tens wheel will exhibit 1, because the transfer lever will have been operated during the movement of the tens wheel of the total register by the tens wheel of the item register, and hence its action will have been lost. This would result in error, because the total register would exhibit a total of 10, whereas the addition of an item of 11 to a previous total of 9 should give a new total of 20. Therefore, in a machine of the character under consideration it is necessary to defer the actual operation of the transfer mechanism until the positive operation of the primary wheels by the item wheels has been completed.

To attain this end, I provide what I term a transfer lock 100, which is common to all the transfer levers 79 and serves to retain all of said levers in their normal positions until the item wheels have been completely reset, after which the transfer lock releases the transfer levers for the purpose of permitting the operation of such levers as may have been selected by the operation of the selectors 87 during the operation of the primary wheels. The transfer lock 100 is in the form of a vibrator mounted to swing from a transfer bar 101 located adjacent to the lower front corner of the casing 42. As shown in Figs. 3 and 21, this lever includes a locking bar 102 extending across the entire series of transfer levers 79 and disposed normally to engage alined notches 103 formed in the front edges of the transfer levers just above the guide arms 81. The lock 100 also includes a pair of arms 104 which extend forwardly from the fulcrum 101 and project through the front wall of the casing 42, being equipped at their front ends with cams 105 arranged to coact with cams 106 formed upon and movable with the side members of the item carrier 53.

By reference to Fig. 4, it will be seen that when the item carrier 53 has moved back, the cams 106 thereon will be located behind the cams 105 of the transfer lock and that in this position of the parts the locking bar 103 will be in engagement with all of the transfer levers. Therefore, when the item wheels 50 are turned back to operate the primary wheels of the total register, such of the primary wheels as move from 9 to 0 will swing back their selectors 87 to the position indicated in Fig. 5 where said selectors will be held by the detents 93. The transfer levers will not drop, however, since their action is deferred by reason of the transfer lock 101 engaging the levers and retaining them in their normal positions, notwithstanding the actuation of the selectors. As soon, however, as the item wheels have been completely reset, and begin to move away from the total register, as shown in Fig. 7, the cams 106 will coact with the cams 105 to swing the transfer lock 100 out of engagement with the transfer levers. When thus released, those transfer levers whose selectors have been moved back, will drop down to the position shown in Fig. 8 to advance the proper wheels of the total register. Should this advance movement of any of the wheels cause said wheels to move from 9 to 0, the selector of the next higher transfer member will be thrown back and said member will be permitted to drop immediately, since the transfer lock is now in its disengaged position. The forward movement of the locking bar 102 is also utilized to move the dogs 83 into engagement with the primary wheels, it being observed that in the normal position of the bar 102 it is located immediately behind the lower ends of the several transfer dogs, so that, as it moves forward to release the levers, it simultaneously urges the transfer dogs forward to present them over the teeth of the primary wheels $a'$, $b'$, etc. To prevent the locking bar 102 from obstructing the downward movement of the transfer dogs with the transfer levers, the rear edges of said dogs are curved substantially concentric with the axes of the levers, as shown.

*The item-transfer motor.*

We have now seen that the wheels of the item register are set up one by one by the operation of the master wheel, as the digits are successively printed on the work sheet, and that, if the number set up on the item register is found to be correct, the item wheels are automatically moved back to the total register and simultaneously operated to transfer the complete item to the latter. While it is possible to effect this transfer of the item from the item register to the total register by the manipulation of the error key, I prefer to employ what I term an item-transfer motor 106′, which is automatically brought into action as soon as the item carrier has moved the item wheels into engagement with the primary wheels of the total register.

Journaled in suitable bearings at one side of the casing 42 is a short motor shaft 107 upon which is wound a motor spring 108 inclosed by a casing 109 and secured at one end to the shaft 107 and at its opposite end to the casing. Loosely mounted on the shaft 107 is a comparatively large motor gear 110 provided on one side face with a pawl 111 disposed to be engaged by the teeth of a ratchet wheel 112 keyed or otherwise fixed to the motor shaft. The motor spring 108 rotates the motor shaft 107 and the ratchet 112, which latter, by engagement with the pawl 111, rotates the motor gear 110 in the direction of the arrow in Fig. 14.

Keyed to one end of the shaft 52 of the item register is a resetting pinion 113 disposed opposite the motor gear 110 and arranged to move into mesh therewith when the item register is moved back, as shown in Fig. 14.

*The locking means for the item transfer motor.*

Normally, the motor gear 110 is locked by a motor lock or detent 114 pivotally mounted on the side of the casing 42 and urged by a spring 115 into engagement with an interdental space of the gear, see Fig. 13.

*The automatic motor release.*

In order that the transfer of the item to the total register, and the return of the item register to its normal position in the operative plane of the master wheel, may be accomplished with sufficient despatch to enable the operator to begin the recording of a new number immediately upon the retraction of the carriage, it is necessary that the various mechanisms concerned in the transfer shall be brought into action with the utmost promptness at the proper time. I have therefore arranged means operated by the backward movement of the item carrier 53 for automatically releasing the motor the instant the item wheels have moved completely into engagement with the primary wheels of the total register. This automatic releasing means includes a releasing member 116 pivotally mounted at its lower end on the casing 42 and designed to be swung by the item carrier 53 through the medium of an interposed link 117, see Fig. 13. When the carrier 53 is in its forward position, the releasing member 116 assumes the position shown in Fig. 13. When the carrier 53 is moved back to present the item register to the total register, the resetting pinion 113 is moved into engagement with the motor gear 110, as already stated, and the releasing member 116 is swung back to engage the detent 114 and move the latter out of engagement with the motor gear 110, as shown in Fig. 14. The motor gear being thus released, will be driven in the direction of the arrow in Fig. 14 by the spring 108 and will rotate the pinion 113 and the shaft 52 and thus swing the yoke 62 to reset the item wheels and to cause the latter to operate the corresponding wheels of the total register.

*The automatic release of the item carrier after the transfer of the item.*

It has already been explained how the movement of the bar 60 swings the lever 69 for the purpose of moving the overthrow dog 66 into engagement with the item wheels when the latter have been reset upon the discovery of an error.

Figure 5:
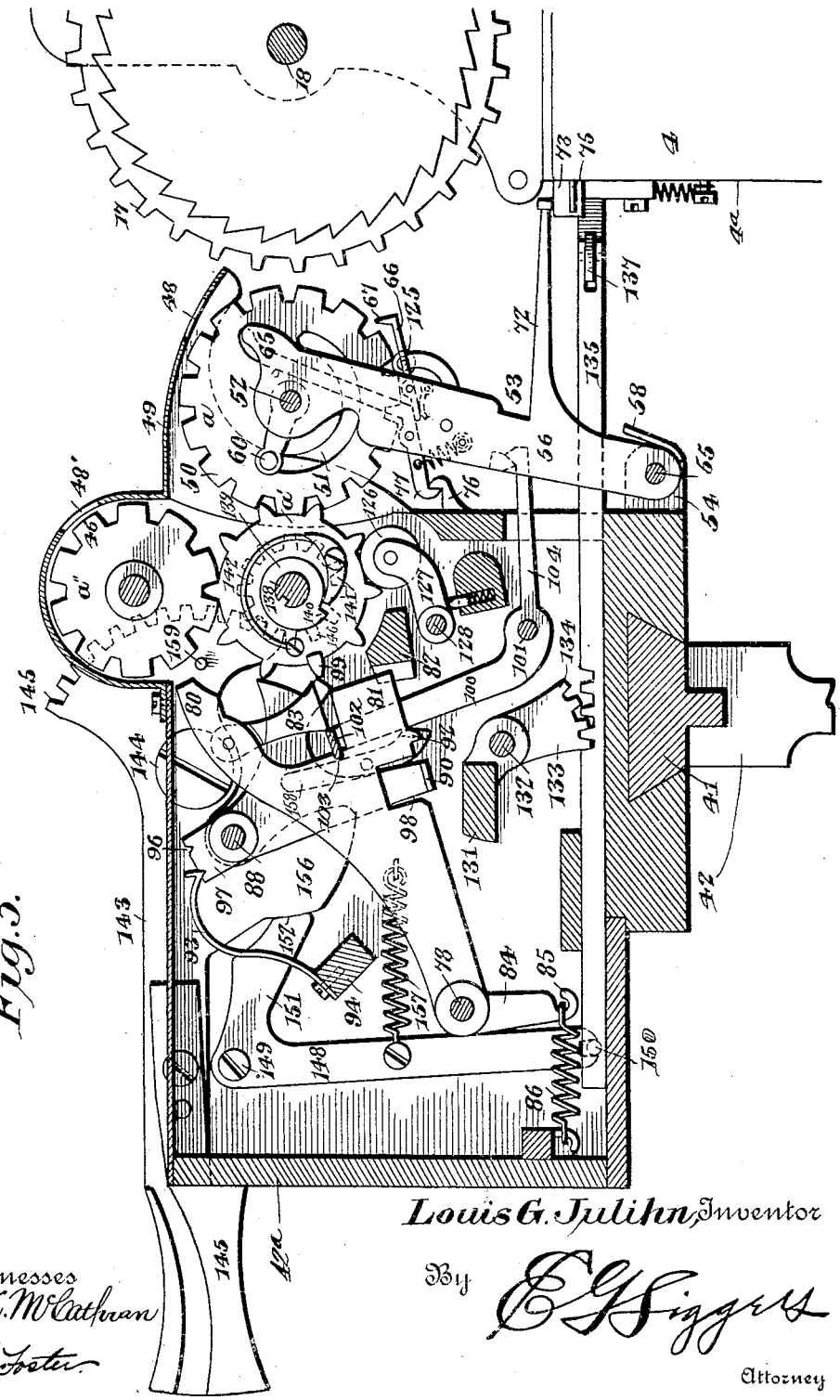
Fig. 5 is a similar view, showing the parts in the positions they assume during the transfer of a number or item from the item register to the total register and just as one of the transfer selectors of the total register is swung back.

It will now be obvious that when the motor swings the resetting yoke the bar 60 will, in the same manner, strike the upper end of the lever 69, and swing the same just as the bar reaches the stop 65. Therefore, it will be seen that while the item carrier will be locked in its rearward position, as shown in Fig. 5, during the operation of the item transfer motor, the swinging of the lever 69, as the item wheels reach their completely reset positions, will not only cause the movement of the overthrow dog 66 into engagement with the item wheels to prevent overrunning thereof, but will also effect the withdrawal of the hook 77 of the latch lever 69 from the keeper 76, thus releasing the item carrier 53 and permitting said carrier to move forward under the impulse of the spring 57 to re-present the item register in its normal position. As the carrier 53 is thus released and moved forward, the motor is held against actuation as long as the teeth of the motor gear are in mesh with the resetting pinion 113, since the pinion cannot rotate by reason of the engagement of the resetting bar 60 with the stops 65. During this forward movement of the carrier 53, the releasing member 116 will be swung rapidly forward in view of the fact that the link 117 is connected to said member adjacent to the pivot of the latter. As a consequence, the member 116 will move sufficiently to allow the detent 114 to move back into engagement with the motor gear and thus lock the motor before the motor gear and pinion have been completely disengaged. As soon as the pinion is fully disengaged from the gear, the resetting yoke will be swung back to its normal position by its retracting spring 63 in the manner heretofore explained.

*The motor restoring mechanism.*

When the item transfer motor utilized to cause the transfer of an item to the total register is of the reactive type, as here shown, it is desirable to provide automatic means for restoring the energy expended by the motor in effecting the transfer. In the illustrated embodiment of the invention the motor restoring mechanism is operated by the item carrier 53 during the rearward movement of the latter, so that by the time the item register is moved into engagement with the total register, the motor will be in condition to effect the transfer of the item and may be immediately released in the manner already explained.

Formed at the upper end of the releasing member 116 is a toothed segment 118 meshing with a similar segment 119 formed at the lower end of a motor restoring lever 120 mounted to rotate on the motor shaft 107, see Figs. 13, 17 and 18. At the upper end of the lever 120 is mounted a resetting pawl 121 disposed to engage the teeth of a resetting ratchet 122 keyed or otherwise fixed to the motor shaft 107. When the item register is in its normal position, as shown in Fig. 13, the elements of the motor restoring or rewinding mechanism assume the positions indicated in dotted lines in said figure. As the item carrier 53 moves back, the member 116 will be swung rearwardly, thus swinging the lever 120 which, by reason of the engagement of the pawl 121 with the ratchet 122, will rotate the ratchet, and the motor shaft 107 keyed thereto, for the purpose of rewinding the motor spring 108.

During this operation of the parts the motor gear will be held stationary by the detent 114, but the motor ratchet 112 will rotate with the motor shaft, the teeth of said ratchet clicking idly under the motor pawl 111. Since the resetting ratchet 122 is fixed to the motor shaft, it is obvious that after the motor spring has been rewound the resetting pawl 121 must be released from the resetting ratchet 122, before the motor gear 110 is released by the withdrawal of the detent 114. To accomplish this disconnection of the pawl from the ratchet, said pawl 121 is provided with a cam projection 123 which rides over a fixed disengaging pin 124, see Fig. 14, which withdraws the pawl from the ratchet just before the releasing member 116 effects the release of the motor by the operation of the motor lock or detent 114.

After the motor is rewound in the manner indicated, it is released and operates to transfer the item from the item register to the total register, and as the item carrier 53 moves forward to its normal position, the releasing member 116 permits the detent 114 to reëngage and lock the motor gear 110 and also swings the resetting lever 120 back to its normal position, shown in Fig. 13, so that, when the item carrier 53 again moves back, the motor will be again rewound, in the manner stated, to store sufficient power for the transference of the next item. At this point attention may be directed to the fact that since the rewinding mechanism for the item transfer motor is operated by the item carrier 53, and since said carrier is operated by the movement of the typewriter carriage, the machine may be said to embody an item transfer motor and means operated by the typewriter carriage for automatically rewinding and releasing said motor.

*The wheel locators.*

To secure accurate alinement of the digits opposite the sight openings 48 and 48', as well as to hold the wheels of the item register and the total register in proper position to mesh with each other when the item register is moved back, I provide the item wheels *a*, *b*, etc., with locators 125, and the primary wheels *a'*, *b'*, etc., with similar locators 126, these locators being in the form of rollers mounted at the ends of swinging spring urged members of arms 127. The locator arms for the locators 126 are mounted to swing from a bar 128 extended across the casing 42 and the arms for the locators 125 are similarly mounted on a bar 129 extending across the item carrier 53.

*The means for automatically locking the primary wheels of the total register when carried.*

In describing the machine, the various mechanisms have been considered, as far as possible, in that order in which they are brought into action, and up to this point, the mechanism described is that which sets up the item on the item register, shifts the item register back to the total register, effects the transfer of the item to the total register, the return of the item register to normal position, and the actuation of the carrying mechanism to operate certain of the wheels of the total register.

It is now in order to describe the means for resetting the transfer mechanism preparatory to the transfer of another item to the total register. Before doing this, however, attention is directed to the fact that when a primary wheel *a'*, *b'*, etc., is operated by a transfer lever 79, it is desirable to lock the wheel against movement in either direction. To accomplish this object, each transfer lever 79 is provided with a locking portion or tooth 130 formed to fit between two teeth of the adjacent primary wheel when the lever occupies its depressed position, as shown in Fig. 8. Thus the levers 79 will be seen to constitute not only transfer levers, but locking levers as well, and the computing mechanism may therefore be said to comprehend wheel locking devices controlled by the wheel operated selectors 87 and operated by the transfer motors or springs 86.

*The mechanism for restoring the transfer or carrying levers, the transfer selectors, and the transfer lock to normal position, and for restoring the energy expended by the transfer motors, after each transfer of an item from the item register to the total register.*

As certain of the transfer levers will drop down, as shown in Fig. 8, to operate certain of the primary wheels $a'$, $b'$, etc., when the item register moves forward, to the operative plane of the master wheel, it is obvious that some means for restoring the transfer mechanism to normal position before it is again called into action by the transfer of the next item to the total register must be devised. To attain this end, a transfer lever resetting member in the form of a rocker 131 is mounted to swing from the bar 132 extending across the casing 42 adjacent to the bottom thereof and in rear of the transfer lock 100. When the transfer levers, or any of them, are moved down to their depressed positions, as shown in Fig. 8, their lower edges are moved close to or in contact with the rocker so that, when the latter is swung, as indicated in Fig. 9, the levers will be raised or retracted to their normal positions. Having elevated the transfer levers, the rocker will come in contact with the lower ends of the holding devices or selectors 87 associated with said levers and will move the same positively to their normal positions, where they will be retained by the detents 93 to hold the levers elevated in the manner heretofore explained.

Forming a part of the rocker 131 and depending from the bar 132, is an arm 133 provided at its lower end with a toothed segment 134. This segment meshes with the teeth of a rack bar 135 slidably mounted at the bottom of the casing 42 and projected beyond the front end thereof to dispose it in the paths of movement of two reversely disposed actuators or cams 136 and 136$^a$ mounted on and movable with the typewriter carriage 4. (Compare Figs. 8, 9, 15 and 26). When the carriage is retracted to permit the recording of a new number or item, or advances beyond the column, the actuator 136 or 136$^a$ operates the rack bar 135 to swing the rocker 131 and thus restore the transfer levers to their elevated positions and move the selectors 87 into engagement with the levers, as stated. This operation also effects the unlocking of the primary wheels $a'$, $b'$, etc., by the withdrawal of the levers therefrom and restores the energy expended by the motor springs 86, since it will be seen that the elevation of the levers is effected against the resistance of said springs.

The friction between the rack bar 135 and the actuators or cams is reduced by an anti-friction roller 137 mounted at the end of the bar, and to prevent interference of a cam and the bar during that movement of the carriage which renders the other cam effective, each cam or actuator is pivotally mounted, as shown in Fig. 15, and is designed to yield, as indicated in dotted lines in said figure, when it engages the bar 135 during the movement of the carriage in one direction.

*The means for resetting the total register to zero when a computation has been completed.*

The primary wheels $a'$, $b'$, etc., of the total register are mounted on a normally stationary shaft 138 upon which are fixed a series of resetting cams 139 alternating with the primary wheels. Each of these cams is formed with a shoulder 140 which normally occupies the position shown in Fig. 3, and is alined with the other shoulders of the series. Coöperating with each resetting cam 139 is a resetting dog or pawl 141 pivoted on the left hand side face of the primary wheel located at the right of the cam with which the pawl coöperates, the engaging end or beak of the pawl being urged toward the periphery of the cam by a spring 142.

As the primary wheels rotate on the shaft 138 during the operation of the total register, the pawls 141 travel upon the peripheries of the resetting cams, which remain stationary, and when a wheel makes a complete rotation and arrives at the "0" position, the beak of the pawl drops down slightly in advance of the shoulder 140 of its cam, see Fig. 5. As the wheels will be in various registering positions at the completion of a given computation, the dogs will occupy various positions relative to the cams. If, however, the shaft 138 is rotated in the direction of the arrow in Fig. 10, the shoulders of the cams 138 rotating therewith, will pick up or engage the dogs, regardless of the locations of the latter and a connection between the cams and wheels being thus effected, continued movement of the shaft will rotate the wheels until the latter are restored to zero or reset.

To enable this resetting operation to be effected, a resetting lever 143 is pivoted at 144 to the right hand side of the casing 42, see Figs. 3 and 10, and is provided at its front end with a toothed segment 145 meshing with a resetting pinion 146 keyed or otherwise secured to the shaft 138. The lever 143 is retained in its normal position by a latch lever 147 carried by the resetting lever 143 and coöperating with the casing 42. It will be seen by comparison of Figs. 3, 10 and 11, that the resetting lever 143 may be swung up to effect slightly more than a complete rotation of the shaft 138 and the cams 139 to restore the primary wheels $a'$, $b'$, etc., to their normal or zero positions.

When it is desired to reset the total register, certain of the transfer levers 79 may be in their depressed positions, as shown in Fig. 8, in which positions, as we have already seen, they lock the primary wheels $a'$, $b'$, etc., against movement in either direction. These levers must therefore be elevated or retracted to unlock the wheels before the resetting of the latter can be accomplished. This resetting of the wheel carrying and locking mechanism may be effected, as heretofore described, by the retraction of the carriage 1 of the typewriter through the medium of the cam 136 coacting with the bar 135 to swing the rocker 131, but it is desirable to have the total register complete in itself and to provide means whereby the initial movement of the resetting lever 143 will serve to unlock the primary wheels preliminary to the resetting of the latter.

To this end an angular lever 148 is fulcrumed upon the right hand wall of the casing 42, as indicated at 149, and has a loose pivotal connection at its lower end, as indicated at 150, with the rack bar 135. At its upper end the lever 148 has a forwardly extending arm 151 provided with angularly related cam faces 152 and 153 designed to coact with the cam faces 154 and 155 of a cam 156 formed integral with and depending from the resetting lever 143, see Figs. 3, 10 and 12. At the beginning of the resetting operation certain of the transfer or carrying levers 79 will occupy the positions shown in Fig. 8. In order to reset the wheels, the operator grasps the extension or handle of the lever 143 and having effected the release thereof by the operation of the latch lever 147, swings the resetting lever in the direction of the arrow in Fig. 10. This movement of the lever causes the cam 156 to swing the lever 148 from the position shown in Fig. 8 to that shown in Fig. 10, for the purpose of retracting the rack bar 135 and operating the rocker 131, to retract the transfer levers 79 and to restore the transfer selectors 87 to normal position. Continued upward movement of the resetting lever to the position shown in Fig. 11, will permit the rocker 131 and its associated parts to drop back to their normal positions under the impulse of a spring 157 connected to the lever 148 and to cause the primary wheels $a'$, $b'$, etc., and the registering wheels $a''$, $b''$, etc., to be reset to zero.

Incidental to the resetting of the primary wheels, the transfer selectors 87 will be thrown back by reason of the fact that, as the primary wheels move from 0 to 9, the selectors will be engaged by the transfer lugs 99. Notwithstanding this operation of the selectors, the transfer levers will not drop because they will still be retained by the transfer lock 100. It is desirable, however, to have the transfer levers move into engagement with the primary wheels and positively lock the same when said wheels have been reset, because, since both the primary wheels $a'$, $b'$, etc., and the registering wheels $a''$, $b''$, etc., are loosely mounted on their shafts, they might, unless locked by the transfer levers, rotate beyond the zero position under the impetus gained by the rapid manipulation of the resetting lever. Furthermore, the locking of the wheels when reset is desirable, because otherwise they might be carried out of position during the subsequent reversal of the shaft 138, by reason of the frictional contact between said shaft and the primary wheels.

In view of these considerations, I have devised means whereby the resetting lever 143 will withdraw the transfer lock 100 from the levers 79 so as to permit the latter to drop down and lock the wheels after the selectors 87 have been moved back. This means consists of a trip lever 158, see Fig. 11, fulcrumed upon the right hand side wall of the casing 42 and having its upper end disposed in the path of movement of a pin 159 on the front end of the resetting lever 143. The lower end 160 of the lever 158 is extended laterally in rear of one of the side arms of the transfer lock 100 and in position to engage said lock and shift the same out of engagement with the transfer levers just as the resetting lever reaches the limit of its resetting movement. It will thus be seen that when the resetting lever is swung up, the wheels of the total register will be reset and that, just before said wheels reach their fully reset positions, the selectors 87 will be swung back by the wheels, and the transfer lock 100 will be swung forward by the resetting lever to permit the transfer levers 79 to drop down into locking engagement with the primary wheels $a'$, $b'$, etc., for the purpose of preventing said wheels from moving beyond their reset positions, and for the further purpose of preventing the wheels from rotating with the shaft 138 when the latter is reversely rotated to restore the cams 139 to normal position. To effect this reversal of the shaft 138 and the cams carried thereby, the resetting lever 143 after resetting the wheels in the manner described, is retracted in the direction of the arrow in Fig. 12. During this movement of the lever, the cam 156 thereon will engage the cam 151 of the lever 148 and continued movement of the resetting lever will cause said lever 148 to swing back for the purpose of again operating the rocker 131 to reset the transfer or carrying mechanism and thus effect the unlocking of the reset wheels in order to permit them to receive the items of a new computation. As the resetting lever 143 reaches its normal position, the lever 148 is permitted to swing back in order to restore the rack bar 135 and rocker 131 to the positions shown in Fig. 3, after which the mechanism may again be operated in the manner described to effect another computation.

*The operation of the machine in brief.*

While the operation of the various mechanisms included in the machine organization has been incidentally described, it is deemed proper to recapitulate briefly for the purpose of giving a more comprehensive and connected recital of the operation of the machine as a whole. The normal positions of the parts are those shown in Figs. 1, 3, and 13.

Preliminary to the operation of recording and registering, the operator properly locates the stop or stops of the Laganke tabulator 16 (Fig. 2) and effects a corresponding adjustment of the computing device casing 42 on the register bar 41, so that, upon the arrest of the typewriter carriage 4 by the column stop, the master wheel 17, which is movable with the carriage, will be disposed opposite that item wheel $a$ or $b$, etc., which corresponds in denominational position with that denominational order or position of the column to be added, opposite which the printing point of the typewriter is located. Usually the printing point of the typewriter is arrested by the column stop opposite the units order of the column on the work sheet, and the master wheel is simultaneously arrested opposite the units item wheel. The position of arrest, however, is immaterial, provided the denominational position of the printing point and master wheel with respect to the column and item register, respectively, are in proper correspondence. The machine is now ready to be operated, and the operator will depress the proper numeral keys 8 of the typewriter to print a line of digits which, by reason of their denominational relation, one to another, will constitute a number or item.

As each digit is printed, the master wheel 17 will operate the item wheel, corresponding in denomination with that of the printed digit, a number of increments or units corresponding to the value of the digit. Therefore, as the digits are successively printed, they will be set up on the item wheels and exhibited opposite the sight opening 48 of the item register 50. If, upon the printing of a digit, it is shown by the item register to be erroneous, the item carrier is moved back slightly to remove the item register from the master wheel, and the former is reset by the manipulation of the error key 59. The number is then erased from the work sheet and properly rewritten and registered on the item register. Being assured by the item register that no error has been committed, the operator either advances the typewriter carriage to the right and proceeds with the printing of any desired matter beyond or to the right of the column, or else retracts the carriage preparatory to the printing of another item or number in the column. In either case, the movement of the typewriter carriage automatically causes the transfer of the item or number previously written, to the total register. This is true because, as the carriage is moved either forward or back, the cam 73 or 74, as the case may be, will elevate the arm 72 and thus swing the item carrier 53 from its normal position (Fig. 3) to its rearward or transfer position (Fig. 4), it being observed that the cam, having shifted the item carrier, will be permitted to ride under and beyond the arm 72 so that the movement of the typewriter carriage may be continued without interference.

During the movement of the item carrier 53 from the position shown in Fig. 3 to that shown in Fig. 4, the transfer motor is rewound by the shifting of the rewinding mechanism from the position shown in Fig. 13 to that shown in Fig. 14. Just as the backward movement of the item carrier 53 is completed, the item wheels $a$, $b$, etc., move completely into mesh with the primary wheels $a'$, $b'$, etc., of the total register, the latch lever 69 engages the keeper 76 to lock the item register in its transferring position, the item transfer pinion 113 is brought into mesh with the transfer motor gear 110, and the motor lock 114 is thrown back from its normal position, (Fig. 13) to its released position (Fig. 14) to release the transfer motor.

Figure 6:
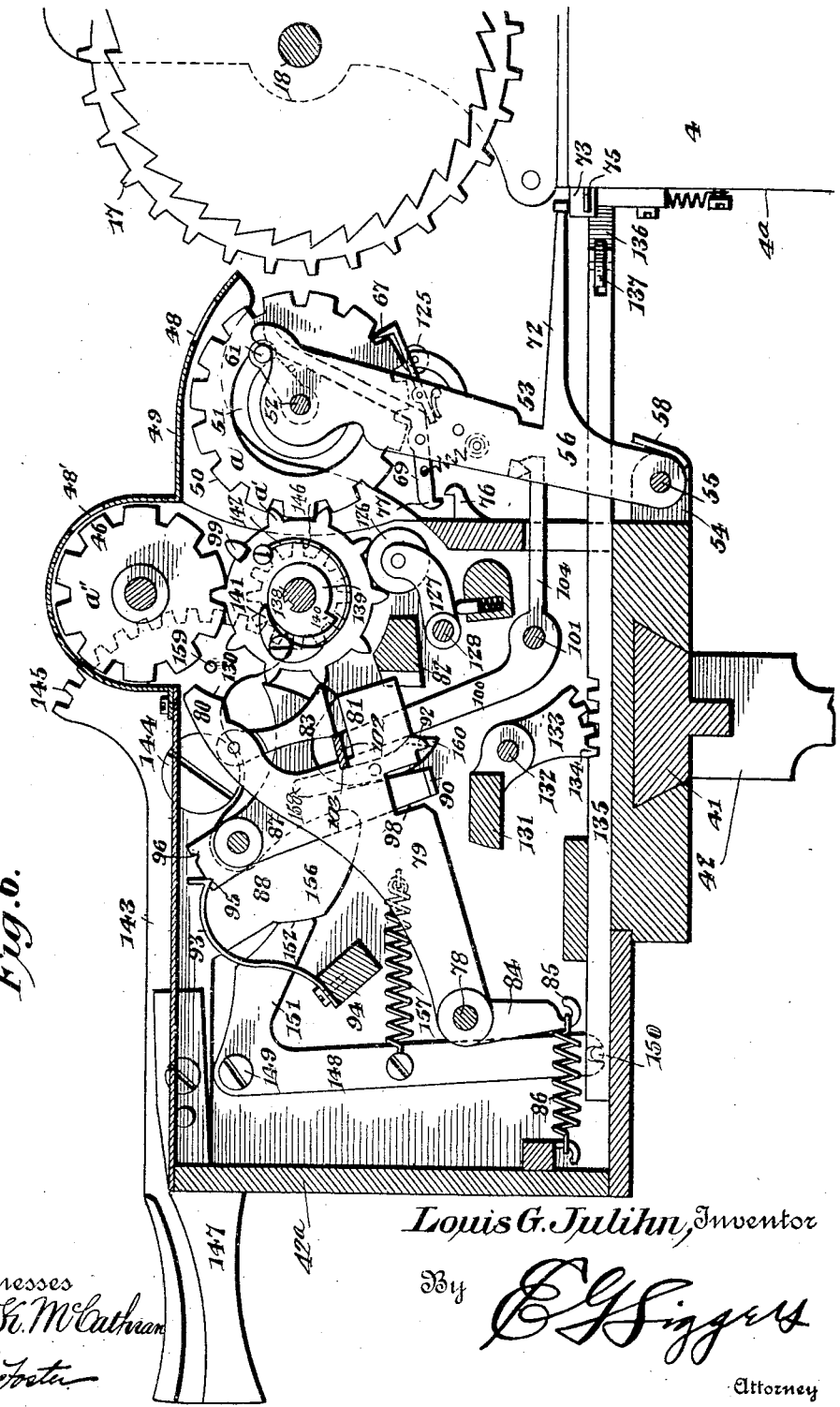
Fig. 6 is a similar view, showing the parts in the positions they assume just as the transfer of the number from the item register to the total register is completed.

The parts will now be in the positions shown in Fig. 4, the item register being removed from the operative plane of the master wheel 17 and being in position to transfer the item to the total register. Immediately upon the release of the transfer motor, the resetting yoke, including the bar 60, is swung up, as indicated in Fig. 5, thus operating the item wheels in the reverse direction to reset the same and causing the wheels thus rotated to transfer the item to the total register by the rotation of the primary wheels $a'$, $b'$, etc., which correspondingly rotate the registering wheels $a''$, $b''$, etc. During this operation of the total register by the item wheels, such of the primary wheels $a'$, $b'$, etc., as move from 9 to 0 will present their transfer lugs 99 to the contact plates 89 of the selectors 87 controlling the transfer levers 79 opposite the wheels of next higher order, and will swing said selectors back, as shown in Fig. 5, in which shifted position said selectors will be held by their detents 93. Immediately before the item wheels have been completely reset, the bar 60 will come in contact with the upper end of the latch lever 69 and will swing the latter out of engagement with the keeper 76 and thus release the item carrier 53 upon the complete resetting of the item wheels. This operation of the latch lever 69 to release the item carrier will also operate the overthrow dog 66 to prevent the item wheels from moving back too far under the impetus gained, see Fig. 6. The item carrier 3 being thus automatically released, will move forward to the operative plane of the master wheel 17. This forward movement of the item carrier will cause the motor lock 114 to lock the motor and will cause the cams 106 on the item carrier to depress the front end of the transfer lock 100 thus withdrawing the locking bar 103 from the notches in the transfer levers 79, and simultaneously causing said bar to move the transfer dogs 83 into operative relation with the primary wheels, see Fig. 7. The movement of the carrier will also withdraw the transfer pinion 113 from the motor gear 110 and the resetting bar 60 will be returned to its normal position by the spring 63, (Fig. 7). Immediately upon the withdrawal of the transfer lock 100 from the transfer levers 79, those levers whose selectors 87 have been moved back, as indicated in Fig. 5, will drop down, as indicated in Fig. 8, thus advancing or carrying those primary wheels which were selected by the shifting of the selectors 87 during the operation of the primary wheels.

The parts will now be in the positions indicated in Fig. 8, and the item having been added to the amount on the total register, the latter will exhibit the total of all of the numbers recorded. A new item may now be set up on the item register, or, if the column has been completed, the numeral keys may be disconnected from the master actuator 17 by the manipulation of the total key 37, and the total exhibited by the total register will be printed at the foot of the column. By reference to Fig. 8, it will be seen that when the item register has moved forward to the operative plane of the master wheel 7, certain of the transfer levers 79 will occupy their depressed positions. This condition of the carrying mechanism will not interfere with the setting up of the next item on the item register, but it will be obvious that the carrying mechanism must be reset in order to release the primary wheels $a'$, $b'$, etc., before said wheels can be again operated by the item wheels $a$, $b$, etc.

This automatic resetting of the transfer mechanism is effected by either the retraction or forward movement of the typewriter carriage 4, since either movement of the carriage will cause one of the actuators 136 or 136$^a$ to shift the slide 135 and thus swing the rocker 131 upwardly from the position indicated in Fig. 8 to that indicated in Fig. 9. The first part of the movement of the rocker will elevate the tranfer levers which have been previously operated, and continued movement of the rocker will cause it to reset the selectors 87 coacting with said levers. As soon as all of the transfer levers are again in their elevated positions, the transfer lock 100 will move back to engage the levers, which will now be held as before, by both the lock and the transfer selectors. As soon as the actuator has passed the rack bar 135, said rack bar, the rocker 131, and the lever 148 will be swung back to their normal positions. It will thus be seen that by the time the movement of the carriage has shifted the item register into coöperative relation with the total register, the carrying mechanism of the latter will have been reset so that the item wheels may be immediately operated to transfer the item to the total register in the manner heretofore described.

After a column has been recorded and its total printed, it is necessary to reset the total register to zero. At such time the parts will or may be in the positions shown in Fig. 8. The operator grasps the rear end of the resetting lever 143, which act will operate the latch lever 147 to release the resetting lever from the frame. The resetting lever is then swung up, its initial movement serving to cause the cam 156 to operate the lever 148, which, through the medium of the rack bar 135, operates the rocker 131 to reset the carrying mechanism of the total register. The first part of this initial movement of the resetting lever is necessarily independent of the primary wheels $a'$, $b'$, etc., since it must be utilized to accomplish the unlocking of said wheels before the latter can be rotated. It is for this reason that when the wheels are in the "0" positions, as shown in Fig. 5, the shoulders 140 of the cams 139 are a slight distance in rear of the engaging ends of the pawls 141. Thus it will be seen that that slight movement of the resetting lever which is necessary to effect the unlocking of the primary wheels also rotates the shaft 138 and cams 139 and brings the shoulders 140 of said cams into contact with the pawls 141 immediately after the transfer levers 79 have been elevated sufficiently to unlock the primary wheels. Continued movement of the resetting lever 141 effects the complete resetting of the carrying mechanism and finally, when the lever has been completely operated, as shown in Fig. 11, the primary wheels $a'$, $b'$, etc., and the registering wheels $a''$, $b''$, etc., will have been reset to zero, the yoke 131 and its associated parts having in the meantime returned to their normal positions upon the withdrawal of the cam 156 from the lever 148. During this wheel resetting operation, the movement of the primary wheels from 0 to 9 will obviously shift the selectors 87 to their releasing positions, thus leaving the transfer levers retained by the transfer lock 100 alone. Just before the resetting lever reaches the limit of its throw, the pin 159 projecting from said lever, will strike the releasing lever 158, and thus swing the latter to move the transfer lock 100 out of engagement with the transfer levers. This release of the transfer levers will begin just as the primary wheels $a'$, $b'$, etc., reach their completely reset positions and will permit the transfer levers to drop down into locking engagement with the primary wheels, as shown in Fig. 11, for the purpose of preventing them from overrunning and for the further purpose of holding the primary wheels stationary during the reverse rotation of the shaft 138 as the resetting lever 143 is retracted.

The wheels of the total register will now have been reset and locked and while the transfer mechanism might be reset by the retraction of the carriage in the manner heretofore stated, it is preferable to restore the carrying mechanism to normal position by the retraction of the resetting lever. Therefore, the arrangement of the cam 156 and lever 148 is such that as the resetting lever is swung down, as indicated in Fig. 12, the lever 148 will be operated by the cam to swing the rocker 131 and thus reset the transfer levers and the selectors, the lever 148, the rocker 131, and the connected parts resuming their normal positions as soon as the cam 156 moves beyond the lever 148, as shown in Fig. 3. Obviously, as soon as the transfer levers are reset, the transfer lock 100 will engage said levers, and the total register will be in condition to receive an item as soon as the latter has been set up on the item register and the latter moved back to its transferring position.

What I claim is:—

1. The combination with a typewriter including a frame, a carriage, carriage propelling mechanism, keys, and printing mechanism, of an item receiving mechanism, an operating mechanism therefor, said last named mechanisms being relatively movable by the carriage propelling mechanism to change their denominational relation, an item accumulating mechanism, and means for resetting the item receiving mechanism to cause item values to be transferred to the accumulating mechanism from the item receiving mechanism.

2. The combination with a typewriter including a frame and carriage, which are relatively movable, and also including printing mechanism and keys, of an item receiving mechanism adapted to be reset and operating mechanism therefor, the denominational relation of the receiving and operating mechanism being variable by the relative movement of the typewriter frame and carriage, an item accumulating mechanism, and means for causing item values to be transferred thereto from the item receiving mechanism simultaneously with the resetting of the latter.

3. The combination with a typewriter including as primary elements a frame and carriage, which are relatively movable laterally, and also including keys and printing mechanism, of an item receiving mechanism including a series of denominational members mounted on one of said primary elements, a master actuator mounted on the other primary element of the typewriter and coöperatively related to the receiving mechanism and typewriter keys respectively, an accumulating mechanism, and means for causing item values to be transferred thereto from the item receiving mechanism subsequent to the operation of said receiving mechanism.

4. The combination with a typewriter including as primary elements a frame and carriage, which are relatively movable, and also including keys and printing mechanism, of an item receiving mechanism mounted on one of said primary elements and including a series of denominational members, a master actuator therefor mounted on the other primary element of the typewriter, means for causing the master actuator to operate a member of the receiving mechanism when a typewriter key is depressed to print a digit, an accumulating mechanism, and means operative to reset the item receiving mechanism, after the setting up of an item thereon, to cause the item value to be added to the value already accumulated by the accumulating mechanism.

5. The combination with a typewriter including a carriage, keys, and printing mechanism, of an item register arranged to register an item in view of the operator, means for automatically establishing a coöperative relation between the keys and item register at a predetermined point in the travel of the typewriter carriage, a total register, and means for causing the transference of an item value from the item register to the total register.

6. The combination with a typewriter including as primary elements, a frame and a movable carriage and also including keys and printing mechanism, of an item register and a total register both mounted on one of said primary elements and relatively movable into and out of coöperative relation, an actuator mounted on the other primary element of the typewriter, means whereby the actuator will operate the item register upon the depression of the numeral keys of the typewriter, and means for operating the total register.

7. In a combined typewriting and calculating machine, the combination with a traveling carriage, printing mechanism movable with the carriage, and keys also movable with the carriage and controlling the operation of the printing mechanism, of total registering mechanism, and item registering mechanism arranged to register items recorded by the printing mechanism, and to transfer the item values to the total registering mechanism.

8. In a combined typewriting and calculating machine, the combination with a traveling carriage and printing mechanism and keys movable with said carriage, of an item register operatively related to the keys, and a total register coöperating with the item register to accumulate item values subsequent to the registration of such values in the items register.

9. In a typewriting and calculating machine, the combination with a traveling carriage, of printing mechanism and keys movable with the carriage, an item register controlled by the keys and arranged to register the digits included in the item or number as said item or number is recorded by the printing mechanism, a total register and means for causing the transference of item values from the item register to the total register.

10. In a combined typewriting and calculating machine, the combination with a traveling carriage and printing mechanism and keys movable with the carriage, of an item register arranged to register successive items as they are recorded by the printing mechanism, means controlled by the keys for changing the denominational position of the printing mechanism and for simultaneously changing the denominational relation of the keys with respect to the item register, a total register, and means for resetting the item register to transfer the item to the total register.

11. In a combined typewriting and calculating machine, the combination with a typewriter including a frame, a carriage movable on the frame, and printing mechanism and keys movable with the carriage, of a computing device mounted on the frame and including an item register and a total register, means for operating the item register to register an item when the keys are operated to cause the recording of said item, and means for causing the transfer of an item from the item register to the total register.

12. In a combined typewriting and calculating machine, the combination with a typewriter including a frame, a traveling carriage, and printing mechanism and keys movable with the carriage, of an item register adjustable on the frame of the typewriter to dispose it in position for use with reference to different columns, means for causing the item register to register the items recorded by the printing mechanism, and item-totalizing means coacting with the item register.

13. In a combined typewriting and calculating machine, the combination with a typewriter including a frame, a traveling carriage, and printing mechanism and keys movable with the carriage, of a computing device adjustable on the frame of the typewriter and including an item register and a total register, means for causing the item register to register successive items as said items are recorded by the printing mechanism, and means for resetting the item register to transfer an item value to the total register.

14. In a calculating machine, the combination with a total register and a master means, of an item register interposed between the total register and the master means and including a series of denominational members arranged to be operated one at a time by the master means, said item register being movable away from the operative plane of the master means and into operative relation with the total register.

15. In a calculating machine, the combination with a total register having a series of denominational members, of a master means, and an item register interposed between the total register and the master means and having a series of denominational members permanently located opposite the denominational members of the total register, said item register being normally located in the operative plane of the master wheel, and movable out of such plane and into coöperative relation with the total register.

16. In a combined typewriting and calculating machine, the combination with a typewriter including printing mechanism and keys, of a total register, and an item register normally disposed for operation by the keys of the typewriter to register an item recorded by the printing mechanism and movable from its normal position to engage and operate the total register for the purpose of transferring the item value thereto.

17. In a calculating machine, the combination with a total register, an item register, and operating means for the item register, of a carriage movable to change the denominational relation of the item register and its operating means, and means operative during the movement of the carriage to cause an operative relation to be established between the total register and the item register.

18. In a calculating machine, the combination with a total register, an item register normally out of operative relation therewith, and operating means for the item register, of a carriage movable to change the denominational relation of the item register and its operating means, and means operated by the movement of the carriage to cause a coöperative relation to be established between the total register and the item register.

19. In a calculating machine, the combination with a total register, an item register, and operating means for the item register, of a carriage movable to change the denominational relation of the item register and its operating means, and means operated by the carriage to effect relative movement of the registers to present the same in coöperative relation.

20. In a combined typewriting and calculating machine, the combination with a typewriter including printing mechanism, keys, and a movable carriage, of an item register having its operation controlled by the keys, and a total register, the coöperative relation of the total and item registers being controlled by the typewriter carriage.

21. In a combined typewriting and calculating machine, the combination with a typewriter including printing mechanism, keys, and a movable carriage, of an item register operated by the keys to register an item simultaneously with the recording of said item by the printing mechanism, a total register, and means operated by the typewriter carriage to cause a coöperative relation to be established between the item and total registers.

22. In a calculating machine, the combination with printing mechanism, keys, and a traveling carriage, of an item register, a total register, and means operated by the movement of the carriage in either direction for establishing a coöperative relation between the item and total registers.

23. In a combined typewriting and calculating machine, the combination with a typewriter including printing mechanism, keys, and a movable carriage, of an item register, means whereby the item register will be caused to register an item simultaneously with the recording thereof by the printing mechanism, a total register adapted to be operated by the item register, and means controlled by the typewriter carriage for shifting the item register into engagement with the total register.

24. In a combined typewriting and calculating machine, the combination with a typewriter including printing mechanism, keys, and a traveling carriage, of an item register adapted to register an item recorded by the printing mechanism, a movable carriage for the item register, a total register adapted to be operated by the item register, and means whereby the movement of the typewriter carriage will operate the item carrier to shift the item register into coöperative relation with the total register.

25. In a calculating machine, the combination with a total register, an item register, and means for operating the item register, of a traveling carriage, and an item carrier operated by the traveling carriage to shift the item register into coöperative relation with the total register.

26. In a combined typewriting and calculating machine, the combination with a typewriter including printing mechanism, keys, and a movable carriage, of a total register, an item register coöperatively related to the keys, and an item carrier arranged to be swung by the typewriter carriage to move the item register into coöperative relation with the total register.

27. In a calculating machine, the combination with a total register, a shiftable item register, and operating means for the latter, of mechanism for shifting the item register into coöperative relation with the total register and operating means alternately, and a lock resisting premature shifting of the item register.

28. In a calculating machine, the combination with a total register, of an item register, resetting mechanism for the item register, and an overthrow dog operated by the resetting mechanism.

29. In a calculating machine, the combination with a total register and an item register, one of which is movable into and out of coöperative relation with the other, a locking device for holding the movable register in one position, and an overthrow dog operated by the locking device to engage the item register.

30. In a calculating machine, the combination with a total register and an item register, one of which is movable into and out of coöperative relation with the other, of a locking device for the movable register, an overthrow dog operated by the locking device to engage the item register, and a resetting device for the item register arranged to operate the locking device to release the movable register and to move the overthrow dog into engagement with the item register just as said item register is completely reset.

31. In a calculating machine, the combination with a total register and an item register, one of which is movable into coöperative relation with the other, of a carriage movable in a direction at right angles to the direction of relative movement of the registers, means operated by the carriage to shift the movable register, and means for locking said register in its shifted position.

32. In a combined typewriting and calculating machine, the combination with a typewriter including keys, printing mechanism and a movable carriage, of a total register and an item register, one of which is movable into and out of coöperative relation with the other, and means whereby the movement of the movable register in one direction will be controlled by the typewriter carriage.

33. In a combined typewriting and calculating machine, the combination with a typewriter including printing mechanism, keys, and a movable carriage, of a total register, an item register movable into coöperative relation with the total register, means for operating the item register, and means whereby the movement of said item register from its normal position will be controlled by the typewriter carriage.

34. In a combined typewriting and calculating machine, the combination with a typewriter including printing mechanism, keys, and a movable carriage, of a total register, a movable item register, means for operating the item register, means operated by the typewriter carriage to effect relative movement of the registers to present the same in coöperative relation, means for resetting the item register to transfer the item value to the total register, and means for restoring the normal relation of the registers.

35. In a combined typewriting and calculating machine, the combination with a typewriter including printing mechanism, keys, and a movable carriage, of a movable item register, a total register, means controlled by the typewriter keys for operating the item register, means operated by the typewriter carriage to move the item register into engagement with the total register, means for resetting the item register to transfer the item value to the total register, and means for returning the item register to its normal position.

36. In a combined typewriting and calculating machine, the combination with a typewriter including printing mechanism, keys, and a movable carriage, of a total register, a movable item register, means controlled by the typewriter keys for operating the item register, means operated by the typewriter carriage to shift the item register into engagement with the total register, means for locking the item register in its shifted position, means for resetting the item register to transfer the item value to the total register, said resetting means being arranged to operate the locking means to release the item register, and means operative upon the release of the item register to return the same to its normal position.

37. In a combined typewriting and calculating machine, the combination with a typewriter including printing mechanism, keys, and a movable carriage, of a computing device including a total register and an item register normally out of coöperative relation, and mechanism for performing the following functions, to-wit: the operation of the item register to register a number or item as the same is recorded by the printing mechanism of the typewriter, the automatic establishment of an operative relation between the item register and the total register upon the movement of the typewriter carriage subsequent to the recording and registering of an item, the resetting of the item register to zero and the simultaneous transfer of the item value to the total register, and finally, the destruction of the coöperative relation between the item and total registers to enable the item register to receive a new item without affecting the total register.

38. In a combined typewriting and calculating machine, the combination with a typewriter including printing mechanism, keys, and a movable carriage, of a master actuator coöperatively related to the keys, a total register, an item register normally disposed in the operative plane of the master actuator and including a series of denominational members, the denominational relation of the item register and master actuator being controlled by the movement of the typewriter carriage, means operated during the movement of the typewriter carriage to shift the item register out of the operative plane of the master actuator and into coöperative relation with the total register, and means for resetting the item register to transfer the item value to the total register.

39. In a combined typewriting and calculating machine, the combination with a typewriter including printing mechanism, keys, and a movable carriage, of a master actuator controlled by the typewriter keys, a shiftable item register including a series of denominational members arranged to be successively engaged and operated by the master actuator, a total register, and mechanism whereby when an item has been set up on the item register, said register will be moved into coöperative relation with the total register and reset to transfer the item value and finally returned to its normal position to receive another item.

40. In a calculating machine, the combination with a total register, a master actuator, and an item register having a series of denominational members arranged to be operated by the master actuator, said item register being movable into and out of engagement with the total register, of a movable carriage controlling the denominational relation between the master actuator and the item register and also controlling the movement of the item register into coöperative relation with the total register.

41. In a combined typewriting and calculating machine, the combination with a typewriter including printing mechanism, keys, and a movable carriage, of a master actuator arranged to be advanced laterally by the carriage and having its operative movement controlled by the typewriter keys, an item register mounted independently of the carriage and including a series of denominational members successively engaged by the master actuator, a total register, and means for effecting the transfer of an item value from the item register to the total register.

42. In a calculating machine, the combination with a total register, of an item register movable into and out of engagement therewith and including a series of denominational members, a master actuator for the members of the item register, and a traveling carriage controlling the movement of the item register and arranged to advance the master actuator to successive members of the item register and to subsequently shift the item register into coöperative relation with the total register.

43. In a combined typewriting and calculating machine, the combination with a typewriter including printing mechanism, keys, and a movable carriage, of a master wheel movable with the carriage and arranged to be operated by the typewriter keys, an item register having a series of denominational members disposed to be operated by the master wheel, a total register, means operated by the typewriter carriage for shifting the item register into engagement with the tool register, and means for resetting the item register to transfer the item value to the total register.

44. In a combined typewriting and calculating machine, the combination with a typewriter including printing mechanism, keys, and a traveling carriage, of an item register, key controlled operating means for said register, a movable carrier for the item register, means operated by the typewriter carriage for moving the carrier to shift the item register, a total register arranged to engage the item register when shifted, and means for resetting the item register to transfer the item value to the total register.

45. In a calculating machine, the combination with a typewriter including a movable carriage, of a total register and an item register, one of which is movable to engage the other, and a carrier for the movable register, said carriage coöperating with the carrier to shift the same to effect the engagement of the register.

46. In a calculating machine, the combination with a total register and an item register, of a swinging carrier for one of the registers, a movable carriage provided with a cam disposed to engage and swing the carrier, means for setting up an item on the item register, and means for transferring the item value from the item register to the total register.

47. In a combined typewriting and calculating machine, the combination with a typewriter including printing mechanism, keys, and a movable carriage, of an item register including a series of item wheels, a movable item carrier, a total register, a master wheel arranged to be operated by the typewriter keys and movable laterally by the typewriter carriage to engage successive item wheels, means operated by the typewriter carriage to shift the item carrier for the purpose of moving the item register into engagement with the total register, and means for resetting the item wheel while in engagement with the total register to transfer the item value to the latter.

48. In a calculating machine, the combination with a total register, operating means, and an interposed item register, a movable carriage for shifting the item register into engagement with the total register, means for resetting the item register to transfer the item value to the total register, and means independent of the carriage for re-shifting the item register to its normal position.

49. In a calculating machine, the combination with a total register and an item register each including a series of denominational members and means for setting up an item on the item register, of means for causing a coöperative relation to be established between the registers, and a normally inoperative transfer motor automatically brought into action upon the establishment of such connection to transfer the item value from one register to the other, said motor being common to a plurality of members of different denominations.

50. In a calculating machine, the combination with a total register, an item register, and means for setting up an item on the latter, of a normally inactive transfer motor, and means automatically operated to bring the motor into action at the proper time to effect the transfer of the item value to the total register.

51. In a calculating machine, the combination with a total register and an item register, one of which is movable into coöperative relation with the other, of means for setting up an item on the item register, a transfer motor operative to effect a transfer of the item value to the total register, and means automatically operated to bring the transfer motor into action when the movable register moves into coöperative relation with the other register.

52. In a calculating machine, the combination with a total register, and an item register movable into engagement therewith, of means for setting up an item on the item register, a transfer motor, and means automatically operative upon the movement of the item register into engagement with the total register to bring the transfer motor into action.

53. In a calculating machine, the combination with a total register, of an item register movable into and out of engagement therewith, means for setting up an item on the item register, a transfer motor operative to transfer the item value to the total register, a lock for the motor, and means movable with the item register to operate the lock and release the transfer motor when the item register moves into coöperative relation with the total register.

54. In a calculating machine, the combination with a total register, and an item register, one of which is movable into coöperative relation with the other, of means for setting up an item on the item register, a carrier for the movable register, a transfer motor operative to transfer the item value to the total register, and means controlled by the carrier and operative to bring the transfer motor into action.

55. In a calculating machine, the combination with a total register, of an item register, means for setting up an item on the item register, resetting means for the item register, a normally inactive motor for operating the resetting means and automatic means for bringing said motor into action.

56. In a calculating machine, the combination with a total register, an item register, and means for setting up an item on the item register, of a movable carrier for the item register, a transfer motor operative to transfer an item value from the item register to the total register, and means operated by the movable carrier to bring the transfer motor into action.

57. In a calculating machine, the combination with a total register, of an item register, resetting mechanism for the item register including a pinion, a transfer motor including a motor gear, and means for effecting relative movement of the pinion and gear to present them in and out of mesh.

58. In a calculating machine, the combination with a total register, an item register, and keys operative to set up an item on the item register, of a motor operative to transfer the item value to the total register, and automatic means for bringing the transfer motor into action at the proper time.

59. In a calculating machine, the combination with a total register, of an item register including a series of denominational members, means for operating said members one at a time to set up an item, and a transfer motor operative to reset the several denominational members simultaneously to transfer the item value to the total register.

60. In a calculating machine, the combination with a total register, of an item register including a series of denominational members, means for operating the denominational members one at a time to set up an item, resetting means common to all of the denominational members and including a transfer motor, and automatic means for bringing said motor into operation at the proper time.

61. In a calculating machine, the combination with a total register, an item register including a series of denominational members, and means for operating said members one at a time to set up an item, of a transfer motor operative to transfer an item value to the total register, a movable carriage, and means operated by said carriage to effect an operative relation between the item and total registers and to bring the motor into action.

62. In a combined typewriting and calculating machine, the combination with a typewriter including printing mechanism, a movable carriage, and keys, of an item register, means for setting up an item on the item register as said item is recorded by the printing mechanism of the typewriter, a total register, a transfer motor operative to transfer the item value to the total register, and automatic means controlling the operation of the motor.

63. In a combined typewriting and calculating machine, the combination with a typewriter including printing mechanism, keys, and a movable carriage, of an item register, means for setting up an item on the item register as said item is recorded by the printing mechanism of the typewriter, a total register, a transfer motor operative to transfer the item value to the total register, and means whereby the operation of the motor is controlled by the typewriter carriage.

64. In a combined typewriting and calculating machine, the combination with a typewriter including printing mechanism, keys, and a movable carriage, of an item register, means for setting up an item on the item register as said item is recorded by the printing mechanism of the typewriter, a total register operative to transfer the item value to the total register, and means whereby the coöperative relation of the item and total registers and the operation of the motor will be controlled by the typewriter carriage.

65. In a combined typewriting and calculating machine, the combination with a typewriter including printing mechanism, keys, and a movable carriage, of an item register, means for setting up an item on the item register as said item is recorded by the printing mechanism of the typewriter, a total register, a transfer motor operative to transfer the item value to the total register, and means operated by the typewriter carriage for moving one of the registers into engagement with the other.

66. In a combined typewriting and calculating machine, the combination with a typewriter including printing mechanism, keys, and a movable carriage, of a key controlled actuator, an item register including a series of denominational members arranged to be operated one at a time by the actuator, the denominational relation of the item register and actuator being controlled by the typewriter carriage, a total register, and a transfer motor operative to reset the item register and to simultaneously transfer the item value to the total register.

67. In a combined typewriting and calculating machine, the combination with a typewriter including printing mechanism, keys, and a movable carriage, of an item register including a series of denominational members, means for operating said members one at a time to set up an item as said item is recorded by the printing mechanism of the typewriter, a total register, a transfer motor operative to transfer the item value to the total register, and motor controlling means coöperatively related to the carriage of the typewriter.

68. In a combined typewriting and calculating machine, the combination with a typewriter including printing mechanism, keys, and a movable carriage, of an item register, means for setting up an item on the item register as said item is recorded by the printing mechanism of the typewriter, a total register, a transfer motor operative to transfer the item value to the total register, and automatic means for establishing a coöperative relation between the item and total registers and for bringing the transfer motor into action.

69. In a combined typewriting and calculating machine, the combination with a typewriter including printing mechanism, keys, and a movable carriage, of an item register, means for setting up an item on the item register as said item is recorded by the printing mechanism of the typewriter, a total register, and means automatically operative upon the retraction of the typewriter carriage to transfer the item value to the total register.

70. In a combined typewriting and calculating machine, the combination with a typewriter including printing mechanism, keys, and a movable carriage, of an item register, means for setting up an item on the item register as said item is recorded by the printing mechanism of the typewriter, a total register, and means operative upon the movement of the typewriter carriage to establish a coöperative relation between the item and total registers.

71. In a combined typewriting and calculating machine, the combination with a typewriter including printing mechanism, keys, and a movable carriage, of an item register, means for setting up an item on the item register as said item is recorded by the printing mechanism of the typewriter, a total register, and means operative upon the movement of the typewriter carriage to establish a coöperative relation between the item and total registers and to reset the item register for the purpose of transferring the item value to the total register.

72. In a combined typewriting and calculating machine, the combination with a typewriter including printing mechanism, keys, and a movable carriage, of an item register, means for setting up an item on the item register as said item is recorded by the printing mechanism of the typewriter, a total register, a motor operative to transfer the item value to the total register, and means operative upon the retraction of the typewriter carriage to bring the motor into action.

73. In a combined typewriting and calculating machine, the combination with a typewriter including printing mechanism, keys, and a movable carriage, of an item register, means for setting up an item on the item register, a total register, a transfer motor operative to reset the item register, and a motor lock operated by the typewriter carriage.

74. In a combined typewriting and calculating machine, the combination with a typewriter including printing mechanism, keys, and a movable carriage, of an item register, means for setting up an item on the item register as said item is recorded by the printing mechanism of the typewriter, resetting mechanism for the item register, a transfer motor for operating the resetting mechanism to reset the item register and to transfer the item value to the total register, a motor lock, and means operative upon the retraction of the typewriter carriage to establish a coöperative relation between the total and item registers and to operate the motor lock to release the motor.

75. In a combined typewriting and calculating machine, the combination with a typewriter including printing mechanism, keys, and a movable carriage, of an item register, means for setting up an item on the item register, a total register, a transfer motor operative to reset the item register and to transfer the item value to the total register, and means operated by the typewriter carriage to move the item register into coöperative relation with the total register and to bring the motor into action.

76. In a combined typewriting and calculating machine, the combination with a typewriter including printing mechanism, keys, and a movable carriage, of an item register, means for setting up an item on the item register when the item is recorded by the printing mechanism of the typewriter, a total register, means operative upon the retraction of the typewriter carriage to move the item register into engagement with the total register, and means for resetting the item register to transfer the item value to the total register.

77. In a combined typewriting and calculating machine, the combination with a typewriter including printing mechanism, keys, and a movable carriage, of an item register, means for setting up an item on the item register, a total register, a movable carrier for the item register, means operative upon the retraction of the typewriter carriage to move the carrier and thus shift the item register into engagement with the total register, a transfer motor operative to reset the item register while in engagement with the total register, and means controlling the operation of the motor and in turn controlled by the carrier of the item register.

78. In a calculating machine, the combination with a total register and an item register, of means for setting up an item on the item register, a transfer motor operative to transfer the item value to the total register, and means for restoring the energy expended by said motor.

79. In a calculating machine, the combination with a total register and an item register, of means for setting up an item on the item register, a transfer motor operative to transfer the item value to the total register, and automatic means for restoring the energy expended by said motor.

80. In a calculating machine, the combination with a total register and an item register, of means for setting up an item on the item register, a transfer motor for transferring an item value to the total register, means operative to effect a coöperative relation between the item and total registers, and motor restoring mechanism operated by said means.

81. In a calculating machine, the combination with a total register and an item register, of means for setting up an item on the item register, a motor operative to transfer the item value to the total register, means for moving one of the registers into engagement with the other, and means operative during such movement to restore the energy previously expended by the motor.

82. In a calculating machine, the combination with a total register, an item register, and means for setting up an item on the item register, of means including a transfer motor for transferring the item value to the total register, means for moving one register relative to the other, and means operative during such movement to restore the energy previously expended by the motor.

83. In a calculating machine, the combination with a total register, an item register, and means for setting up an item on the item register, one of said registers being movable into engagement with the other, of means including a transfer motor for resetting the item register to transfer an item value to the total register, a motor lock for the transfer motor, and automatic means operative, during the movement of the movable register, to restore the energy previously expended by the motor and to operate the motor lock to release the motor.

84. In a calculating machine, the combination with a register, including a series of denominational members, of a resetting motor therefor arranged to reset said members simultaneously, and motor restoring mechanism operative to restore the energy expended by the motor.

85. In a calculating machine, the combination with a register, of a resetting motor therefor, a motor lock, and motor restoring means movable to restore the energy expended by the motor and to operate the motor lock.

86. In a calculating machine, the combination with a register, of a resetting motor therefor, said motor and register being relatively movable into and out of coöperative relation, and motor restoring means operative during such relative movement.

87. In a calculating machine, the combination with a register, of a resetting motor therefor, said register and motor being relatively movable into and out of coöperative relation, and means operative during such relative movement to restore the energy previously expended by the motor and to thereafter release the motor to permit the same to operate.

88. In a calculating machine, the combination with a register, a resetting motor therefor, and a motor lock, of motor restoring mechanism including a member movable to restore the energy previously expended by the motor and to subsequently operate the motor lock to release the motor.

89. In a computing device, the combination with a series of wheels, of a series of transfer levers, transfer dogs carried by the levers and movable into engagement with the wheels, a series of wheel operated selectors for determining which of the transfer levers shall operate, and a transfer lock controlling the operation of the selected levers and movable to release said levers and to move the transfer dogs into engagement with the wheels.

90. In a computing device, the combination with a series of wheels, of a series of spring actuated transfer levers therefor, transfer dogs movably mounted on the levers, a series of wheel operated selectors movable to determine which of the transfer levers shall operate, and a transfer lock common to the transfer levers and movable to release said levers and to move the transfer dogs into engagement with the wheels.

91. In a computing device, the combination with a series of wheels, of a series of transfer levers, an independent motor for each lever, transfer dogs movable with the levers, a series of selectors each arranged to be swung to an inoperative position by one of the wheels, and a swinging transfer lock common to the several transfer levers and movable to release said levers and to move the transfer dogs into engagement with the wheels.

92. In a computing device, the combination with a series of denominational members, operating means therefor, a movable carrier for the operating means, carrying mechanism for the denominational members including a series of selectors operated during the movement of said members to determine the members to be operated by the carrying mechanism, and means operated by the movable carrier to bring the carrying mechanism into action to operate the denominational members selected.

93. In a computing device, the combination with a series of denominational members, transfer mechanism therefor including a series of carrying devices, and a series of member operated selectors coöperating therewith, of a transfer lock controlling the operation of the selected carrying devices, operating mechanism for the denominational members, a movable carrier for the operating mechanism, and a cam movable with the carrier and arranged to operate the transfer lock to permit the operation of the selected carrying devices.

94. In a computing device, the combination with a series of denominational members, of a motor arranged to operate a plurality of said denominational members at the same time, carrying mechanism including a series of selectors operated during the movement of the denominational members to determine which of said members shall be carried, means for disconnecting the motor from the denominational members, means operative subsequent to such disconnection to bring the carrying mechanism into action, a series of item wheels arranged to operate the denominational members, and a master means operative to set up an item on the item wheels.

95. In a computing device, the combination with a series of denominational members and an operating motor therefor, of a series of carrying devices for the members, a transfer lock holding the carrying devices inactive, a series of selectors operated by the denominational members to determine which of the carrying devices shall operate when released by the transfer lock, and means operative subsequent to the operation of the motor to move the transfer lock and thus release the selected carrying devices.

96. In a calculating machine, the combination with a total register, an item register arranged to operate the same, and a movable carrier for the item register, of a series of carrying devices for the total register, automatic selectors for the carrying devices, and means operated by the movement of the item carrier for causing the selected carrying devices to be operated.

97. The combination with a total register including a series of denominational members and carrying mechanism therefor, of an item register including a series of denominational members, a motor operative to reset the item register and to operate the denominational members of the total register, automatic means for bringing the motor into operation at the proper time, and automatic means for bringing the carrying mechanism of the total register into action after the item register has been reset.

98. In a calculating machine, the combination with a register, of a motor arranged to operate said register, and motor controlled means for disconnecting the motor from the register.

99. The combination with a register including denominational members and carrying mechanism, of a motor arranged to operate the denominational members, and means for automatically disconnecting the motor from the members and for bringing the carrying mechanism into action.

100. The combination with a total register, an item register, and means for setting up an item on the latter, of a motor operative to reset the item register and to cause the latter to operate the total register, and carrying mechanism controlled by the motor and operative after the item register has been completely reset.

101. In a calculating machine, the combination with a total register including a series of denominational members, carrying mechanism therefor, and selectors operated by the denominational members to determine which of said members shall be operated by the carrying mechanism, of an item register, means for setting up an item on the item register, means operative to reset the item register and to cause said item register to operate the denominational members of the total register, and automatic means for bringing the carrying mechanism into action after the item register has been reset.

102. In a calculating machine, the combination with a total register including a series of denominational members, carrying mechanism therefor, and selecting mechanism operated during the movement of the denominational members to determine which of said members shall be subsequently advanced by the carrying mechanism, of an item register, means for setting up an item thereon, and a motor operative to reset the item register and to cause the latter to operate the denominational members of the total register, and means controlled by the motor and adapted to bring the carrying mechanism of the total register into action at the proper time.

103. The combination with a total register including denominational members, carrying devices, and selectors for determining which of the carrying devices shall operate, of an item register including a series of denominational members, a motor, means for establishing a coöperative relation between the item and total registers, means for bringing the motor into action to reset the item register and to cause the operation of the denominational members of the total register, and means for bringing the carrying mechanism of the total register into action after the item register has been reset.

104. In a calculating machine, the combination with a total register including a series of denominational members, a series of carrying devices, and a series of selectors, of an item register including a series of denominational members, means for setting up an item on the item register, resetting mechanism for the item register, a motor adapted to operate the resetting mechanism, a movable item carrier for the item register, and a motor controlling means operated by said carrier.

105. In a calculating machine, the combination with a total register including denominational members, selective mechanism and carrying means, of an item register movable into and out of engagement with the total register, means for setting up an item after the item register has been disengaged from the total register, a motor operative to reset the item register to cause the latter to operate the total register, means for automatically bringing the motor into action when the registers are brought into engagement, and means for bringing the carrying mechanism of the total register into action when the registers are disengaged.

106. In a calculating machine, the combination with a total register including denominational members, a series of carrying devices, and a series of selectors operated by the denominational members to determine which of the carrying devices shall operate, an item register, a movable carrier therefor, a motor operative to reset the item register and to cause the operation of the denominational members of the total register, means operative upon the movement of the carrier in one direction to restore the energy previously expended by the motor and to bring said motor into action, and means operated by the movement of the carrier in the opposite direction to bring the carrying mechanism of the total register into action.

107. In a combined typewriting and calculating machine, the combination with a typewriter including printing mechanism, keys, and a movable carriage, of an item register, key controlled means for setting up an item on the item register, a total register including a series of denominational members, carrying mechanism therefor, selecting mechanism for determining which of the denominational members shall be operated by the carrying mechanism, means for operating the denominational members of the total register to transfer an item value thereto, and means controlled by the item transferring means and operative subsequent to the operation of said members to bring the carrying mechanism into action.

108. In a combined typewriting and calculating machine, the combination with a typewriter including printing mechanism, keys, and a movable carriage, of an item register, means for setting up an item on the item register as said item is recorded by the printing mechanism of the typewriter, a total register, spring operated carrying mechanism for the total register, means for operating the total register from the item register, and means restraining the action of the carrying mechanism until after the denominational members of the total register have been operated.

109. In a combined typewriting and calculating machine, the combination with a typewriter including printing mechanism, keys, and a movable carriage, of an item register including a series of denominational members, means for setting up an item thereon as said item is recorded by the printing mechanism of the typewriter, a total register including denominational members and carrying mechanism, a motor arranged to simultaneously reset the operated members of item register and to operate the corresponding denominational members of the total register, and means for bringing the carrying mechanism of the total register into action after the members of the total register have been operated by the motor.

110. In a combined typewriting and calculating machine, the combination with printing mechanism, keys, and a movable carriage, of an item register including a series of denominational members, means, controlled by the keys of the typewriter, for operating said members one at a time to set up an item as said item is recorded by the printing mechanism of the typewriter, a total register including a series of denominational members, a series of spring operated carrying devices, and a series of selectors operated by the denominational members to determine which of the carrying devices shall operate, means operative to reset the item register and to operate the proper denominational members of the total register, and means, operative subsequent to the action of the resetting means to permit the selected carrying devices of the total register to operate.

111. In a computing device, the combination with a series of denominational members, of transfer mechanism therefor, a transfer lock, and means for resetting the denominational members and for causing the transfer lock to be operated to release the transfer mechanism.

112. In a computing device, the combination with a series of denominational members and a series of transfer members, of a series of transfer selectors operated by the denominational members to release the transfer members, a transfer lock retaining the transfer members and independent of the denominational members, and resetting mechanism arranged to reset the denominational members and to cause the transfer lock to be operated.

113. In a computing device, the combination with a series of wheels, of a series of transfer members therefor, a series of transfer selectors normally retaining the transfer members but movable to inoperative positions by the wheels, a transfer lock retaining the transfer members, resetting mechanism for the wheels, and means independent of the wheels and controlled by the resetting mechanism to operate the transfer lock for the purpose of permitting the selected transfer members to advance the proper wheels.

114. In a computing device, the combination with a series of wheels, transfer mechanism therefor, and wheel operated selectors for the transfer mechanism, of a transfer lock, and a wheel resetting lever movable to reset the wheels and to cause the release of the transfer lock.

115. In a computing device, the combination with a series of wheels, of a series of spring actuated transfer levers, a transfer lock common to the levers, and a wheel resetting lever operative to reset the wheels and to cause the transfer lock to be moved for the purpose of releasing the levers to allow the same to move into engagement with the wheels.

116. In a computing device, the combination with a series of wheels, of a series of transfer devices therefor, a series of wheel operated transfer selectors, a transfer lock common to the several transfer levers, a resetting member for the wheels, and means whereby the operation of the transfer lock is controlled by the resetting member.

117. In a computing device, the combination with an item register and a total register each including a series of denominational members, of a master actuator arranged to operate successive denominational members of the item register, means for resetting the item register to operate the denominational members of the total register, carrying devices for the members of the total register, selectors movable to determine which of the carrying devices shall operate, and reactive means for operating the selected carrying devices after the item register has been reset.

118. In a computing device, the combination with a master actuator and a total register including a series of denominational members, of an item register including a series of denominational members located between the master actuator and the total register and arranged to be operated by said actuator, means for effecting relative movement of the registers to present the same in coöperative relation after an item has been set up on the item register, a series of motor operated carrying devices for the members of the total register, a series of selectors movable to determine which of the carrying devices shall operate, means operative to reset the item register to transfer the item value to the total register, automatic means for effecting relative movement of the registers to present them out of coöperative relation, and a transfer lock movable to release the transfer devices of the total register to permit the same to advance the proper wheels of said register after the relative movement of the registers has presented the same out of coöperative relation.

119. The combination with a typewriter including a frame, a carriage, keys, and printing mechanism, of an item register including a series of denominational members mounted on the typewriter, a master actuator also mounted on the typewriter, the denominational relation of the item register and actuator being changed by the movement of the typewriter carriage, a total register including a series of denominational members, transfer devices therefor, and selectors movable by the denominational members to determine which of the transfer devices shall operate, means operative to reset the item register, to operate the proper denominational members of the total register and to operate the proper selectors, and means for causing the selected transfer devices to operate to advance the proper denominational members of the total register after the item register has been reset.

120. In a combined typewriting and calculating machine, the combination with a typewriter including printing mechanism, keys, and a traveling carriage, of a total register, an item register coöperatively related to the keys, and means controlled by a movable element of the typewriter and operative to cause an item value to be transferred to the total register from the item register.

121. The combination with a typewriter including printing mechanism, keys, and a traveling carriage, of an item register, means whereby the operation of the keys will cause an item to be simultaneously recorded and registered, a total register, and means controlled by an element of the typewriter and operative to reset the item register and to accumulate the item value on the total register.

122. The combination with a typewriter including printing mechanism, keys, and a movable carriage, of a total register and an item register one of which is movable into and out of coöperative relation with the other, and means controlled by an element of the typewriter and operative to move one of the registers.

123. The combination with a typewriter including printing mechanism, keys, and a movable carriage, of a total register and an item register one of which is movable into and out of coöperative relation with the other, means operated by the typewriter keys to set up an item on the item register, means controlled by an element of the typewriter and operative to move one register into coöperative relation with the other, and means operative to simultaneously reset the item register and to accumulate an item value on the total register.

124. The combination with a typewriter including a carriage, keys, and printing mechanism, of an item register, means operative to set up an item on the item register and coöperatively related to the keys of the typewriter, a total register, and a motor having its operation controlled by an element of the typewriter and operative to cause an item value to be accumulated on the total register.

125. The combination with a typewriting machine including printing mechanism, keys, and a movable carriage, of an item register, means for causing an item to be set up on the item register as said item is recorded by the printing mechanism of the typewriter, a total register, and means whereby the ordinary manipulation of the typewriter incidental to the operation of typewriting will cause the item value to be transferred from the item register to the total register.

126. In a machine of the character described, a typewriter including a traveling carriage, a counter operating mechanism, a source of power and means controlled by the carriage for automatically causing the operation of the counter operating mechanism by the source of power when the carriage reaches a predetermined point in its travel.

127. In a machine of the character described, a typewriter including a traveling carriage, a total receiving mechanism and an item receiving mechanism, means for causing an item value to be received by the item receiving mechanism, a source of power, and means controlled by the carriage for automatically causing said item value to be accumulated in the total receiving mechanism by the source of power when the carriage reaches a predetermined point in its travel.

128. In a machine of the character described, a typewriter including a traveling carriage, a total receiving mechanism, an item receiving mechanism, means for causing the item receiving mechanism to receive an item value as the typewriter is operated, a source of power, and means whereby the carriage will control the operation of the source of power to reset the item receiving mechanism and accumulate the item value in the total receiving mechanism.

129. The combination with a typewriter including, as primary elements, a frame and carriage which are relatively movable, and also including keys and type bars operated by the keys to print any desired words and numbers, of an item receiving mechanism, mounted on one of said primary typewriter elements and including a series of denominational members, means whereby the item receiving mechanism and certain of the type bars will be simultaneously operated upon the depression of the numeral keys of the typewriter, an item accumulating mechanism, and means for resetting the item receiving mechanism to cause successive item values to be transferred to the accumulating mechanism from the item receiving mechanism.

130. The combination with a typewriter including as primary elements a frame and carriage, which are relatively movable and also including keys and printing mechanism, of an item receiving and registering mechanism mounted on one of said primary elements, mechanism arranged to operate the item receiving mechanism and mounted on the other primary element of the typewriter, accumulating mechanism, and means for causing item values to be transferred to the accumulating mechanism from the item receiving mechanism subsequent to the registration of the complete item by the item receiving mechanism.

131. The combination with a typewriter including a frame, a carriage, keys and printing mechanism, of item registering mechanism including registering and operating units mounted on the typewriter frame and carriage respectively, a total register, and means for causing the transference of item values thereto from the item register after the registration of a complete item on the item register.

132. In a combined typewriting and calculating machine, the combination with a typewriter including printing mechanism, keys and a traveling carriage, of a total register, an item register including denominational members bearing digits and coöperatively related to the keys to register an item in full view as the same is recorded by the printing mechanism, means for effecting the transfer of the item from the item register to the total register and automatic means controlling such transfer and brought into action by movement of the carriage.

133. In a calculating machine, the combination with printing mechanism, an item register including a series of denominational members, each bearing a series of digits, keys and means whereby the operation of the keys will cause an item to be simultaneously recorded and registered, of a total register, means for effecting the transfer of the item value from the item register to the total register and automatic means controlling such transfer and brought into action by the movement of the carriage.

134. In a calculating machine, the combination with a total register, of an item register including a series of denominational members, each bearing a series of digits, means for operating said members one at a time to set up an item, a transfer motor common to the several denominational members of both registers and operative to transfer the item value to the total register, and automatic means for establishing a coöperative relation between the item and total registers and for bringing the motor into action.

In testimony that I claim the foregoing as my own, I have hereto affixed my signature in the presence of two witnesses.

LOUIS G. JULIHN.

Witnesses:
JOHN H. SIGGERS,
S. GEORGE TATE.

Copies of this patent may be obtained for five cents each, by addressing the "Commissioner of Patents, Washington, D. C."